(12) United States Patent
Rothuizen et al.

(10) Patent No.: US 12,367,901 B1
(45) Date of Patent: Jul. 22, 2025

(54) SEGMENTED TAPE HEAD

(71) Applicant: INTERNATIONAL BUSINESS MACHINES CORPORATION, Armonk, NY (US)

(72) Inventors: Hugo E. Rothuizen, Oberrieden (CH); Mark Alfred Lantz, Adliswil (CH); Simeon Furrer, Altdorf (CH); Beat Eugen Weiss, Edlibach (CH); Luzius Kronig, Zürich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/611,330

(22) Filed: Mar. 20, 2024

(51) Int. Cl.
*G11B 5/008* (2006.01)
*G11B 5/54* (2006.01)
*G11B 5/56* (2006.01)

(52) U.S. Cl.
CPC ..................... *G11B 5/56* (2013.01)

(58) Field of Classification Search
CPC ....... G11B 5/4893; G11B 5/531; G11B 5/588; G11B 5/00813; G11B 5/00826; G11B 5/00817; G11B 5/652; G11B 5/29; G11B 5/56; G11B 55/17; G11B 5/54; G11B 20/20; G11B 15/6885; G11B 15/1883; G11B 5/4813
USPC ...................................................... 360/77.04
See application file for complete search history.

(56) References Cited

U.S. PATENT DOCUMENTS

| | | | |
|---|---|---|---|
| 6,038,108 A | 3/2000 | Dee | |
| 8,094,402 B2 | 1/2012 | Bui | |
| 9,251,825 B2 | 2/2016 | Biskeborn et al. | |
| 10,032,471 B2* | 7/2018 | Biskeborn | G11B 5/531 |
| 10,236,024 B2 | 3/2019 | Biskeborn | |
| 10,297,280 B1 | 5/2019 | Judd | |
| 11,682,423 B2 | 6/2023 | Bui et al. | |
| 11,783,857 B2 | 10/2023 | Biskeborn | |

(Continued)

OTHER PUBLICATIONS

"Tape Head with Writer to Reader Alignment for Optimal TDS Compensation," IP.com, IP.com No. IPCOM000271790D, Feb. 9, 2023, 6 pp.

(Continued)

*Primary Examiner* — Nabil Z Hindi
(74) *Attorney, Agent, or Firm* — KONRAD, RAYNES, DAVDA & VICTOR LLP; William K. Konrad

(57) ABSTRACT

Provided are a computer program product, device, system, and method for compensating for a nonlinear deformation field of a tape of a tape storage system. In one embodiment, a head beam of a tape head module of a tape drive employing active skew-based TDS compensation, is segmented into linear segments which are pivotally coupled to each other. Each linear beam segment carries a portion of the transducer array of the tape head module to form a tape head module segment. The pivot angle between a pair of pivotally coupled head module segments of the tape head may be controlled by a controllable pivot actuator to provide an independently adjustable skew angle for each module segment with respect to the direction of travel of tape. As a result, it is believed that registration between the transducers of each module segment and data tracks of the tape may be improved.

25 Claims, 14 Drawing Sheets

(56) References Cited

U.S. PATENT DOCUMENTS

2022/0108718 A1  4/2022  Bui
2023/0253011 A1  8/2023  Bui et al.

OTHER PUBLICATIONS

"TDS Compensating Full Span Tape Head," IP.com, IP.com No. IPCOM000265677D, May 5, 2021, 4 pp.

\* cited by examiner

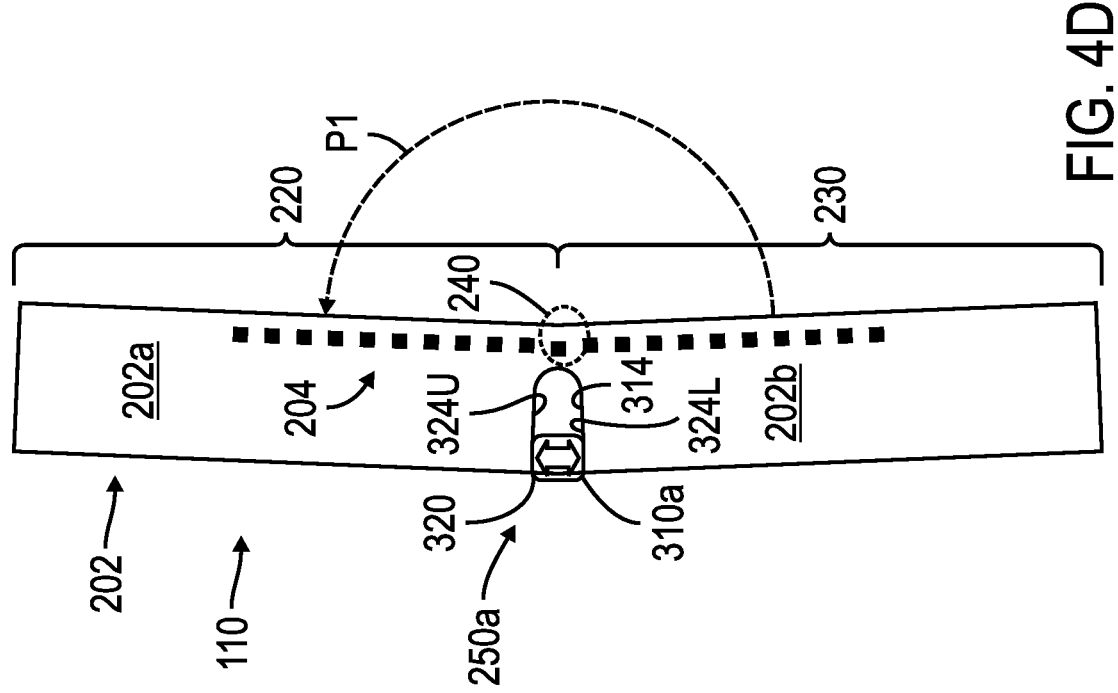
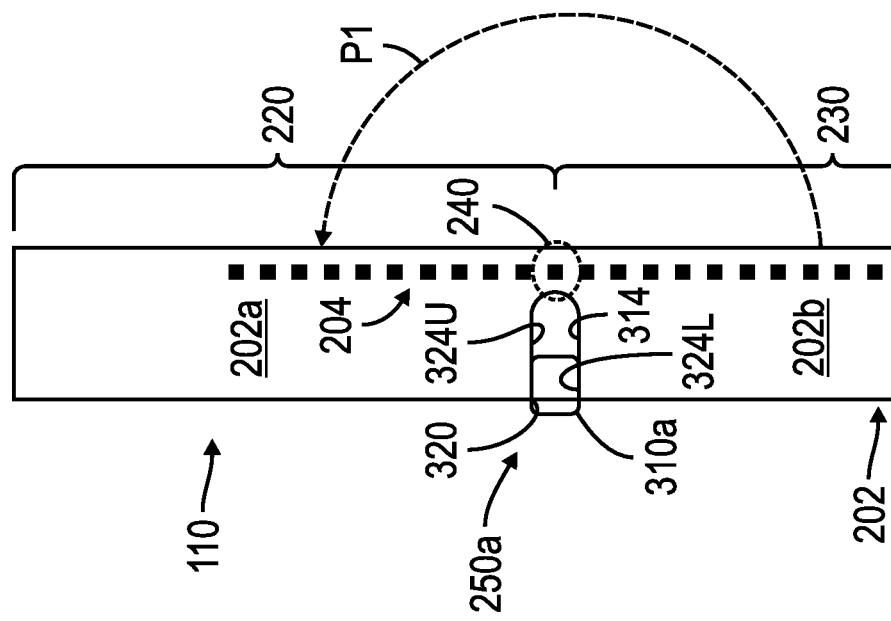
FIG. 4D
FIG. 4C

SEGMENTED TAPE HEAD

BACKGROUND OF THE INVENTION

1. Field of the Invention

The present invention relates to compensating for tape deformation in a storage drive.

2. Description of the Related Art

For many years, tape storage has offered advantages in terms of cost and storage density compared to other storage technologies, such as disk storage. Data is stored in magnetic tape media in units of data such as data segments, for example, where a particular user data segment may vary in size from 1-byte to the entirety of a tape (terabytes (TBs)) or more. Typical applications of tape storage include back-up and archival storage applications.

In magnetic storage systems such as tape drives, data is read from and written onto magnetic recording media through data channels utilizing magnetic transducers in a tape head. As used herein the term "magnetic" refers to the various magnetic technologies including magnetoresistive read transducers, and magnetic media/recording layer technologies. Data is written on the magnetic recording media by moving a magnetic recording write transducer to a position over the media where the data is to be stored. The magnetic recording write transducer also referred to as a writer transducer, writer element, or simply a writer, then generates a magnetic field at a write gap, which encodes the data into a magnetic recording layer as the magnetic media is moved past the transducer. Data is read from the media by similarly positioning a magnetic reading transducer (or reader element or reader) and then sensing the magnetic field of the magnetic media as it moves past the read transducer. Read and write operations may be independently synchronized with the movement of the media to ensure that the data can be read from and written to the desired location on the media.

Known magnetic tape drives often use ring type write transducers in combination with a process known as shingling to write data in a bi-directional, serpentine fashion on magnetic tape. Multiple tracks are written in parallel by a set of writer transducers into a set of data sub-bands. The data sub-bands have a lateral width approximately equal to the pitch between the writer transducers.

A group of tracks written in parallel down the length of tape is referred to as a wrap. In one known tape drive, a set of tracks in a first wrap are written in the forward tape direction at the top of each data sub-band of a group of data sub-bands. At the end of the tape, the position of the head is shifted down and tracks of another wrap are written at the bottom of the data sub-bands. At the end of this first reverse wrap the head is shifted back up and a second set of tracks is written in the forward tape direction below the first set of tracks in the forward tape direction. In this manner, tracks are written within each data sub-band in a serpentine, clockwise pattern, starting at the top of the sub-band and continuing writing wraps as the sub-band fills from outside to inside of the sub-band. This serpentine, clockwise, outside to inside recording pattern continues until each sub-band of the set of data sub-bands has been filled with data tracks.

In addition to readers and writers for reading and writing data, respectively, known tape heads for large scale data storage often include servo transducers to determine the lateral and longitudinal position on the tape for reading and writing. In one known design, servo bands are patterned with data in chevron shapes which are read by the tape head servos to detect the position of the tape head relative to the tape with high accuracy. In this design, when reading or writing to a data band, a servo of the tape head is positioned in a servo band above the data being read from or written to, and another servo is positioned in an adjacent servo band below the data.

A tape storage media may become deformed due to, for example, changes in tape tension, temperature, humidity, creep and other factors. Such tape deformation, particularly changes in the width of the tape, can cause misregistration between the transducers of the tape head and data tracks previously recorded. In addition, the distance between readers or writer transducers can vary from one tape head to another. Misregistration between the transducers of the tape head and data tracks can cause read errors. The sum of all factors that affect track placement and track following is represented as a track-misregistration budget.

Techniques for compensating for misregistration are often referred to as Track Dimensional Stability (TDS) compensation. One such TDS compensation technique measures tape width with servo patterns and adjusts the tension applied to the tape to change the width of tape. However, this approach is often limited in range and can introduce additional problems such as, for example, longer cycle times due to low tension unload, tape cinch, increased risk of tape breakage, variable tape head friction, variable tape head spacing, etc.

Another technique proposed for TDS compensation is referred to as active skew-based control or compensation. In active skew-based compensation, the tape drive is operated with a head that has a nominal, non-zero rotation angle (R) relative to the longitudinal direction of tape travel. The effective span of the head can be increased or decreased by decreasing or increasing the absolute value of the rotation angle, respectively. It is believed that such active skew-based control can enable higher track density and hence increased storage capacity.

SUMMARY

Provided are a computer program product, system, and method for a tape head for writing and reading tracks of data on magnetic tape. In one aspect, a segmented tape head module has a beam substrate and an array of transducers carried on the beam substrate. The beam substrate has a first beam substrate segment member and a second beam substrate segment member pivotally coupled to the first beam substrate segment member for relative pivotal motion between the first and second beam substrate segment members.

In another aspect, the module further has a controllable actuator coupled to the first and second beam substrate segment members and configured to control the relative pivotal motion between the first and second beam substrate segment members. In yet another aspect, the beam substrate has a flexural hinge member pivotally coupling the first and second beam substrate segment members. The flexural hinge member is configured to guide the relative pivotal motion between the first and second beam substrate segment members.

In still another aspect, a computer-implemented method comprises controlling relative pivotal motion between pivotally coupled first and second beam substrate segment members of a beam substrate of a segmented tape head module, to align transducers carried by the beam substrate segment members with the data tracks of the tape as data is transferred between the tape head module and data tracks of the tape. In one embodiment, the data transferring includes at least one of reading from and writing to data tracks of the tape.

In another aspect, controlling the relative pivotal motion between the first and second beam substrate segment members includes actuating a controllable actuator coupled to the first and second beam substrate segment members of the module, to control the relative pivotal motion between the first and second beam substrate segment members. In yet another aspect, actuating the actuator includes flexing a flexural hinge member pivotally coupling the first and second beam substrate segment members, to guide the relative pivotal motion between the first and second beam substrate segment members.

BRIEF DESCRIPTION OF THE DRAWINGS

FIGS. 4A-4D are schematic diagrams depicting one embodiment of fabrication of a thermal pivotal actuator for a segmented tape head module in accordance with the present description.

DETAILED DESCRIPTION

Figure 1:
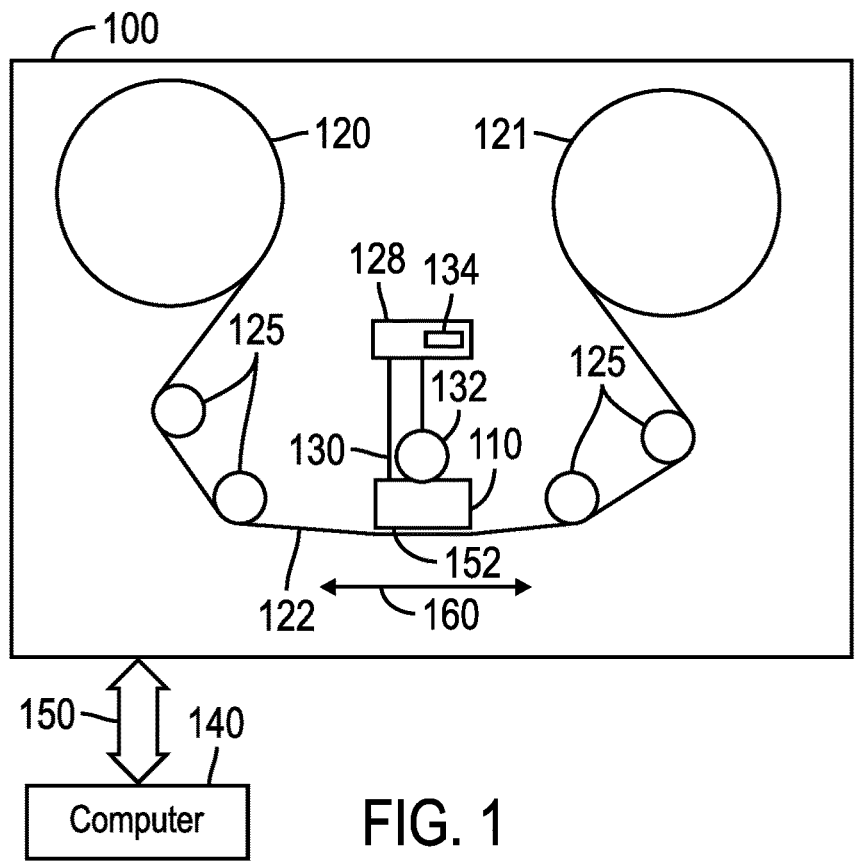
FIG. 1 is a schematic diagram of a data storage system employing segmented tape head skew-based compensation in accordance with one embodiment of the present disclosure.

The description herein provides examples of embodiments of the invention, and variations and substitutions may be made in other embodiments. Several examples will now be provided to further clarify various embodiments of the present disclosure:

Example 1. A tape head for writing and reading tracks of data on magnetic tape, comprising: a module having a beam substrate and an array of transducers carried on the beam substrate where the beam substrate has a first beam substrate segment member and a second beam substrate segment member pivotally coupled to the first beam substrate segment member for relative pivotal motion between the first and second beam substrate segment members. Each beam substrate segment member carries a linear subarray of the array of transducers. Embodiments employing a segmented tape head facilitate independently controlling skew angles of the tape module segments. Independent control of skew angles of tape module segments can improve registration between transducers of the tape module and data tracks of the tape, to improve reliability of data transfers between the tape head module and the data tracks of the tape.

Example 2. The limitations of any of Examples 1 and 3-9, where the module further has a controllable actuator coupled to the first and second beam substrate segment members and configured to control the relative pivotal motion between the first and second beam substrate segment members. An actuator employed in segmented tape head embodiments facilitates independently controlling skew angles of the tape module segments and as a result, improving registration between transducers of the tape module and data tracks of the tape, thereby improving reliability of data transfers between the tape head module and the data tracks of the tape.

Example 3. The limitations of any of Examples 1, 2 and 4-9, where the beam substrate has a flexural hinge member pivotally coupling the first and second beam substrate segment members, where the flexural hinge member is configured to function as a living hinge guiding the relative pivotal motion between the first and second beam substrate segment members. A flexural hinge member employed in segmented tape head embodiments and functioning as a living hinge, facilitates independently controlling skew angles of the tape module segments and as a result, improving registration between transducers of the tape module and data tracks of the tape, thereby improving reliability of data transfers between the tape head module and the data tracks of the tape.

Example 4. The limitations of any of Examples 1-3 and 5-9 where the controllable actuator includes a piezo configured to selectively expand and contract to control the relative pivotal motion between the first and second beam substrate segment members. A piezo actuator employed in segmented tape head embodiments, facilitates independently controlling skew angles of the tape module segments and as a result, improving registration between transducers of the tape module and data tracks of the tape, thereby improving reliability of data transfers between the tape head module and the data tracks of the tape.

Example 5. The limitations of any of Examples 1-4 and 6-9 where the beam substrate has a flexural hinge member comprising a flexible substrate material coupling the first and second beam substrate segment members and configured for flexing to bend the beam substrate between the first and second beam substrate segment members to guide the relative pivotal motion between the first and second beam substrate segment members. A flexural hinge member comprising a flexible substrate material employed in segmented tape head embodiments, facilitates independently controlling skew angles of the tape module segments and as a result, improving registration between transducers of the tape module and data tracks of the tape, thereby improving reliability of data transfers between the tape head module and the data tracks of the tape.

Example 6. The limitations of any of Examples 1-5 and 7-9 where a beam substrate segment member has a width and where the beam substrate has a concave shaped wall defining a beam substrate notch adjacent to the flexural hinge member of the beam substrate so that the flexural hinge member has a reduced width as compared to a beam substrate segment member width. A notch reducing the width of a beam substrate adjacent a flexural hinge member employed in segmented tape head embodiments, facilitates independently controlling skew angles of the tape module segments and as a result, improving registration between transducers of the tape module and data tracks of the tape, thereby improving reliability of data transfers between the tape head module and the data tracks of the tape.

Example 7. The limitations of any of Examples 1-6 and 8-9 where the controllable actuator includes a piezo disposed within the beam substrate notch and configured to engage the notch wall of the beam substrate and selectively expand and contract the beam substrate notch to control the relative pivotal motion between the first and second beam substrate segment members. A piezo actuator disposed in a beam substrate notch and employed in segmented tape head embodiments, facilitates independently controlling skew angles of the tape module segments and as a result, improving registration between transducers of the tape module and data tracks of the tape, thereby improving reliability of data transfers between the tape head module and the data tracks of the tape.

Example 8. The limitations of any of Examples 1-7 and 9 where the controllable actuator includes a thermal actuator disposed within the beam substrate notch and configured to engage the notch wall of the beam substrate and selectively expand and contract the beam substrate notch to control the relative pivotal motion between the first and second beam substrate segment members. A thermal actuator disposed in a beam substrate notch and employed in segmented tape head embodiments, facilitates independently controlling skew angles of the tape module segments and as a result, improving registration between transducers of the tape module and data tracks of the tape, thereby improving reliability of data transfers between the tape head module and the data tracks of the tape.

Example 9. The limitations of any of Examples 1-8 where the beam substrate has a plurality of pairs of adjacent beam substrate members, each pair of adjacent beam substrate members having a beam substrate segment member pivotally coupled to an adjacent beam substrate segment member of the pair, each beam substrate segment member carrying a linear subarray of the array of transducers, and where the module further has for each pair of adjacent beam substrate members, a controllable actuator coupled to adjacent beam substrate segment members of a pair of adjacent beam substrate members and configured to control relative pivotal motion between adjacent beam substrate segment members of a pair of adjacent beam substrate members. Embodiments employing a segmented tape head having a plurality of pairs of pivotally coupled beam substrate members, facilitate independently controlling skew angles of the tape module segments of each pair. Independent control of skew angles of tape module segments of multiple pairs can improve registration between transducers of the tape module and data tracks of the tape, to improve reliability of data transfers between the tape head module and the data tracks of the tape.

Example 10. A computer-implemented method, comprising: transferring data between a segmented tape head module of a tape head and magnetic tape of a data storage system, where the transferring data includes at least one of reading from and writing to data tracks of the tape; and controlling relative pivotal motion between pivotally coupled first and second beam substrate segment members of a beam substrate of the segmented tape head module, to align transducers carried by the beam substrate segment members with the data tracks of the tape as data is transferred between the tape head module and data tracks of the tape. Embodiments employing controlling relative pivotal motion between pivotally coupled beam substrate segment members of a beam substrate of a segmented tape head module facilitate independently controlling skew angles of tape module segments. Independent control of skew angles of tape module segments can improve registration between transducers of the tape module to improve reliability of data transfers between the tape head module and the data tracks of the tape.

Example 11. The limitations of any of Examples 10 and 12-18 where controlling the relative pivotal motion between the first and second beam substrate segment members includes actuating a controllable actuator coupled to the first and second beam substrate segment members of the module, to control the relative pivotal motion between the first and second beam substrate segment members. Embodiments employing an actuator to control relative pivotal motion between pivotally coupled beam substrate segment members of a beam substrate of a segmented tape head module facilitate independently controlling skew angles of tape module segments and as a result, improving registration between transducers of the tape module, thereby improving reliability of data transfers between the tape head module and the data tracks of the tape.

Example 12. The limitations of any of Examples 10-11 and 13-18 where actuating the actuator includes flexing a flexural hinge member pivotally coupling the first and second beam substrate segment members, as a living hinge to guide the relative pivotal motion between the first and second beam substrate segment members. Embodiments employing flexing a flexural hinge member as a living hinge to guide relative pivotal motion between beam substrate segment members of a segmented tape head module, facilitate independently controlling skew angles of the tape module segments and as a result, improving registration between transducers of the tape module and data tracks of the tape, thereby improving reliability of data transfers between the tape head module and the data tracks of the tape.

Example 13. The limitations of any of Examples 10-12 and 14-18 where actuating the actuator includes selectively expanding and contracting a piezo to control the relative pivotal motion between the first and second beam substrate segment members. Embodiments employing selectively expanding and contracting a piezo to control relative pivotal motion between beam substrate segment members of a segmented tape head module, facilitate independently controlling skew angles of the tape module segments and as a result, improving registration between transducers of the tape module and data tracks of the tape, thereby improving reliability of data transfers between the tape head module and the data tracks of the tape.

Example 14. The limitations of any of Examples 10-13 and 15-18 where actuating the actuator includes flexing a flexible substrate material of a flexural hinge member to bend the beam substrate between the first and second beam substrate segment members and to guide the relative pivotal motion between the first and second beam substrate segment members. Embodiments employing flexing a flexible substrate material of a flexural hinge member of a segmented tape head module to guide relative pivotal motion between the beam substrate segment members, facilitates independently controlling skew angles of the tape module segments and as a result, improving registration between transducers of the tape module and data tracks of the tape, thereby improving reliability of data transfers between the tape head module and the data tracks of the tape.

Example 15. The limitations of any of Examples 10-14 and 16-18 where actuating the actuator includes selectively expanding and contracting a beam substrate notch defined by a concave shaped wall adjacent to the flexural hinge member of the beam substrate. Embodiments employing selectively expanding and contracting a beam substrate notch adjacent to a flexural hinge member of the beam substrate, facilitate independently controlling skew angles of the tape module segments and as a result, improving registration between transducers of the tape module and data tracks of the tape, thereby improving reliability of data transfers between the tape head module and the data tracks of the tape.

Example 16. The limitations of any of Examples 10-15 and 17-18 where selectively expanding and contracting the beam substrate notch adjacent to the flexural hinge member includes selectively expanding and contracting a piezo disposed within the beam substrate notch and coupled to the notch wall of the beam substrate to control the relative pivotal motion between the first and second beam substrate segment members. Embodiments employing selectively expanding and contracting a piezo disposed within a beam substrate notch to control relative pivotal motion between beam substrate segment members, facilitate independently controlling skew angles of the tape module segments and as a result, improving registration between transducers of the tape module and data tracks of the tape, thereby improving reliability of data transfers between the tape head module and the data tracks of the tape.

Example 17. The limitations of any of Examples 10-16 and 18 where selectively expanding and contracting a beam substrate notch adjacent to a flexural hinge member includes selectively expanding and contracting a thermal actuator disposed within the beam substrate notch and coupled to the notch wall of the beam substrate to control the relative pivotal motion between the first and second beam substrate segment members. Embodiments employing selectively expanding and contracting a thermal actuator disposed within a beam substrate notch to control relative pivotal motion between beam substrate segment members, facilitate independently controlling skew angles of the tape module segments and as a result, improving registration between transducers of the tape module and data tracks of the tape, thereby improving reliability of data transfers between the tape head module and the data tracks of the tape.

Example 18. The limitations of any of Examples 10-17 further comprising controlling the relative pivotal motions between adjacent pivotally coupled beam substrate segment members of a plurality of pairs of adjacent pivotally coupled beam substrate members, to align transducers of tape module segment members with the data tracks of the tape as data is transferred between the tape head module and data tracks of the tape. Controlling the relative pivotal motion between adjacent pivotally coupled beam substrate segment members of the plurality of pairs of adjacent pivotally coupled beam substrate members includes actuating a plurality of actuators, each actuator being coupled to adjacent beam substrate segment members of a pair of adjacent beam substrate members, to control the relative pivotal motion between adjacent beam substrate segment members of each pair of adjacent beam substrate segment members. Embodiments employing controlling the relative pivotal motions between adjacent pivotally coupled beam substrate segment members of a plurality of pairs of adjacent pivotally coupled beam substrate members by actuating a plurality of actuators, each actuator being coupled to adjacent beam substrate segment members of a pair of adjacent beam substrate members, facilitate independently controlling skew angles of the tape module segments of each pair. Independent control of skew angles of tape module segments of multiple pairs can improve registration between transducers of the tape module and data tracks of the tape, to improve reliability of data transfers between the tape head module and the data tracks of the tape.

Example 19: A computer program product, the computer program product comprising a computer readable storage medium having program instructions embodied therewith, the program instructions executable by a processor to cause the processor to perform a method according to any one of Examples 10-18. Embodiments employing a method for controlling relative pivotal motion between pivotally coupled beam substrate segment members of a beam substrate of a segmented tape head module facilitate independently controlling skew angles of tape module segments. Independent control of skew angles of tape module segments can improve registration between transducers of the tape module to improve reliability of data transfers between the tape head module and the data tracks of the tape.

Example 20: A device comprising at least one processor; and a computer program product comprising a computer readable storage medium having program instructions embodied therewith, the program instructions executable by a processor to perform a method according to any of Examples 10-18. Embodiments employing a method for controlling relative pivotal motion between pivotally coupled beam substrate segment members of a beam substrate of a segmented tape head module facilitate independently controlling skew angles of tape module segments. Independent control of skew angles of tape module segments can improve registration between transducers of the tape module to improve reliability of data transfers between the tape head module and the data tracks of the tape.

Example 21 is an apparatus comprising means to perform a method as claimed in any preceding claim. Embodiments employing a method for controlling relative pivotal motion between pivotally coupled beam substrate segment members of a beam substrate of a segmented tape head module facilitate independently controlling skew angles of tape module segments. Independent control of skew angles of tape module segments can improve registration between transducers of the tape module to improve reliability of data transfers between the tape head module and the data tracks of the tape.

Example 22 is a machine-readable storage including machine-readable instructions, when executed, to implement a method or realize an apparatus as claimed in any preceding claim. Embodiments employing controlling relative pivotal motion between pivotally coupled beam substrate segment members of a beam substrate of a segmented tape head module facilitate independently controlling skew angles of tape module segments. Independent control of skew angles of tape module segments can improve registration between transducers of the tape module to improve reliability of data transfers between the tape head module and the data tracks of the tape.

Described embodiments provide improvements to computer technology for storing and retrieving data in storage systems such as tape drive storage systems, for example. A segmented tape head in accordance with the present description can increase the reliability of transferring data between a tape head and a data band of magnetic tape of a data storage system, such as reading from data tracks of the data band of the tape, in which deformation of the tape has occurred.

For example, it is appreciated herein that the deformation experienced by a tape may not be linear but instead may have a nonlinear deformation field of the tape. In one embodiment, to compensate for such nonlinear deformation, the head beam of a tape head module of a tape drive employing active skew-based TDS compensation, is segmented into linear segments which are pivotally coupled to each other. Each linear beam segment carries a subarray or other portion of the transducer array of the tape head module. In one embodiment, each linear beam segment together with the transducer subarray carried on the beam segment, forms a tape head module segment. The pivot angle between a pair of pivotally coupled head module segments of the tape head may be controlled by a controllable pivot actuator to provide an independently adjustable skew angle for each module segment with respect to the direction of travel of tape. Thus, the tape head module segments may each have a different skew angle which facilitates active skew-based compensation with a more accurate, piecewise linear approximation of a nonlinear deformation field of the tape. As a result, it is believed that registration between the transducers of each module segment and data tracks of the tape may be improved for increased data transfer performance in the tape drive.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. Moreover, the figures are schematic figures in which components are represented by shapes simplified for purposes of clarity. In such schematic diagrams, the relative proportional sizes of the various depicted components are not intended to reflect any particular proportional relationships. For example, components such as read transducers typically measured in microns may be depicted disproportionally large with respect to other much larger components such as tape media or tape heads, typically measured in millimeters, for example, for clarity in presentation.

FIG. 1 is a schematic diagram illustrating a storage system which includes a tape drive 100 having a tape head module 110 of a tape head of the tape drive 100, for reading data from and recording write data to data tracks in wraps on magnetic tape media 122. As described in greater detail below, the tape drive 100 employs a segmented tape head module 110 in accordance with the present description, for active skew-based compensation to provide a more accurate, piecewise linear approximation of a nonlinear deformation field of the tape.

While one specific implementation of a tape drive is shown in FIG. 1, it should be noted that the embodiments described herein may be implemented in the context of any type of tape drive system employing magnetic tape media. In some embodiments, the tape drive 100 may represent a half-height tape drive and in other embodiments, the tape drive 100 may represent a full-height tape drive. Furthermore, it is appreciated that embodiments described herein may be implemented in other types of storage devices having write or read heads for storing or retrieval of data on other types of magnetic media, such as disk drives having sliders, for example. Still further, it is appreciated that a tape head in accordance with the present description may also be employed in other types of magnetic systems such as tape servo formatting systems, for example.

As shown, a tape supply cartridge 120 and a take-up reel 121 are provided to support a magnetic tape 122 referred to herein as magnetic tape, or simply tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over the tape head module 110. The head module 110 includes one or more arrays of transducers such as reader, writer, or servo transducers.

Guides 125 guide the tape 122 across the tape head module 110. Such tape head module 110 is in turn coupled to a tape drive controller 128 via a cable 130. The controller 128 having a memory 134 typically controls head functions such as servo following, writing, reading, etc. The controller may operate under logic such as logic known in the art which may be subsequently developed, or modified as appropriate for segmented tape head skew-based compensation of the present description, as well as any logic disclosed herein. The cable 130 may include read/write circuits or channels to transmit data to the head module 110 to be recorded on the tape 122 and to receive data read by the head module 110 from the tape 122. An actuator 132 is configured to control the lateral and rotational position of the head module 110 relative to the tape 122. An interface of the controller 128 may also be provided for communication between the tape drive and a host (integral or external) or other computer 140 of the storage system to send and receive the data and for controlling the operation of the tape drive and communicating the status of the tape drive to the host, all as will be understood by those of skill in the art. Accordingly, in one embodiment, a host may be represented by the computer 140 and in other embodiments, the computer 140 may be external to both the tape drive 100 and a host.

The storage system represented by the tape drive 100 may include an automated tape library for example, having one or more tape drives 100 docked in the library system. An example of such a tape library is an LTO tape library such as the TS4500 marketed by IBM, which has been modified to employ segmented tape head, skew-based active compensation in accordance with the present description.

The computer 140 represents one or more of host computers, user computers, workstations, storage controllers, or other computers coupled to each other and to the tape drive 100 by one or more networks 150. In one embodiment, a host computer 140 coupled to the tape drive 100 receives requests over a network from user computers to access data in tape cartridges 120 internal to the tape library using tape drives 100 of the tape library.

The computer 140 may be an enterprise computer system in which aspects of a storage system in accordance with the present description may be realized. Examples of enterprise-wide applications include, without limitation, banking transactions, payroll, warehouse, transportation, and batch jobs.

The magnetic tape 122 (FIG. 1) passes over the tape or media facing surfaces 152 of the head module 110 in linear, longitudinal forward and reverse (or backward) directions which are generally parallel to the directions represented by an arrow 160. The longitudinal motion of the tape 122 is provided by actuators which includes reels 120, 121 (FIG. 1). For example, the tape drive uses motors that rotate reels to move the magnetic tape 122 in the linear, longitudinal directions represented by the arrow 160 past the media facing surfaces 152 of the tape head module 110. In this embodiment, the arrow 160 represents the linear, longitudinal directions of motion of the tape caused when being wound and unwound from the reels 120, 121 of the tape drive 100.

As the tape 122 and the head module 110 move relative to each other, the tape 122 may be supported by the media facing surfaces 152 of the head module 110. Hence, the media facing surfaces are sometimes referred to as media bearing surfaces. The tape 122 and the media facing surfaces 152 of the head module 110 are typically in direct contact with each other at least in the region of the tape head where the read and write transducers are located. The head module 110 has transducers which provide one or more media facing surfaces 152 of the head module 110, and are adapted to at least one of read data from and write data to the magnetic tape 122 moving past the tape head transducers of the head module 110. A transducer configured to read data from the tape 122 is referred to herein as a reader transducer, reader element, or simply a "reader."

Figure 2B:
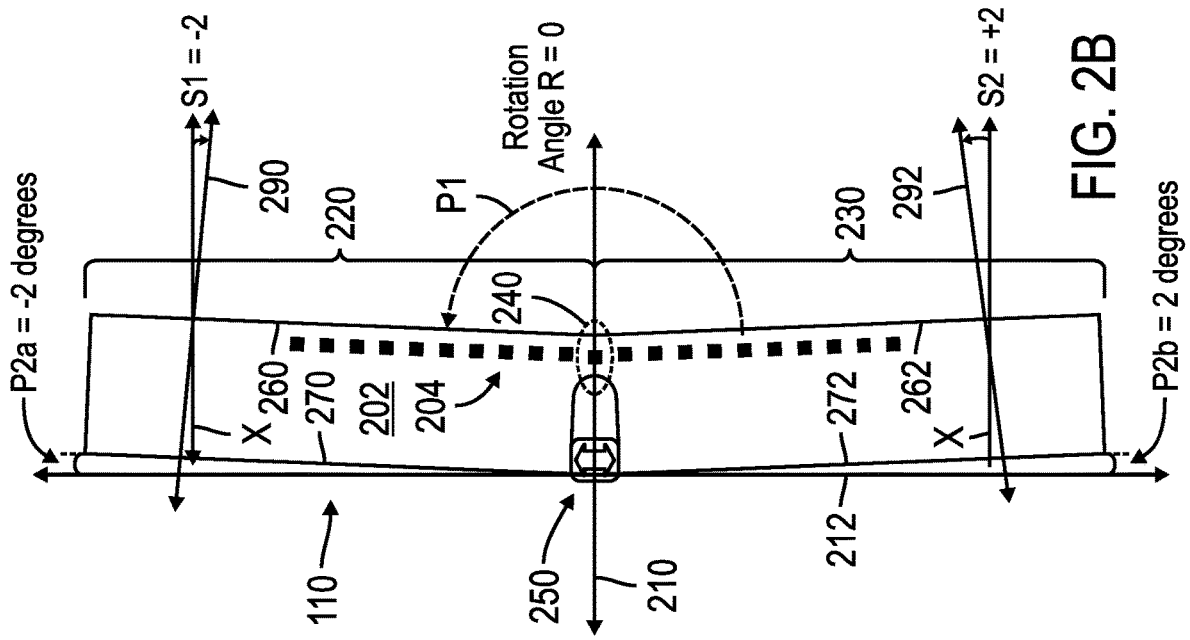
FIGS. 2A-2E are schematic diagrams depicting various rotational and pivotal positions of a segmented tape head module in accordance with one embodiment of the present disclosure.
Figure 2A:
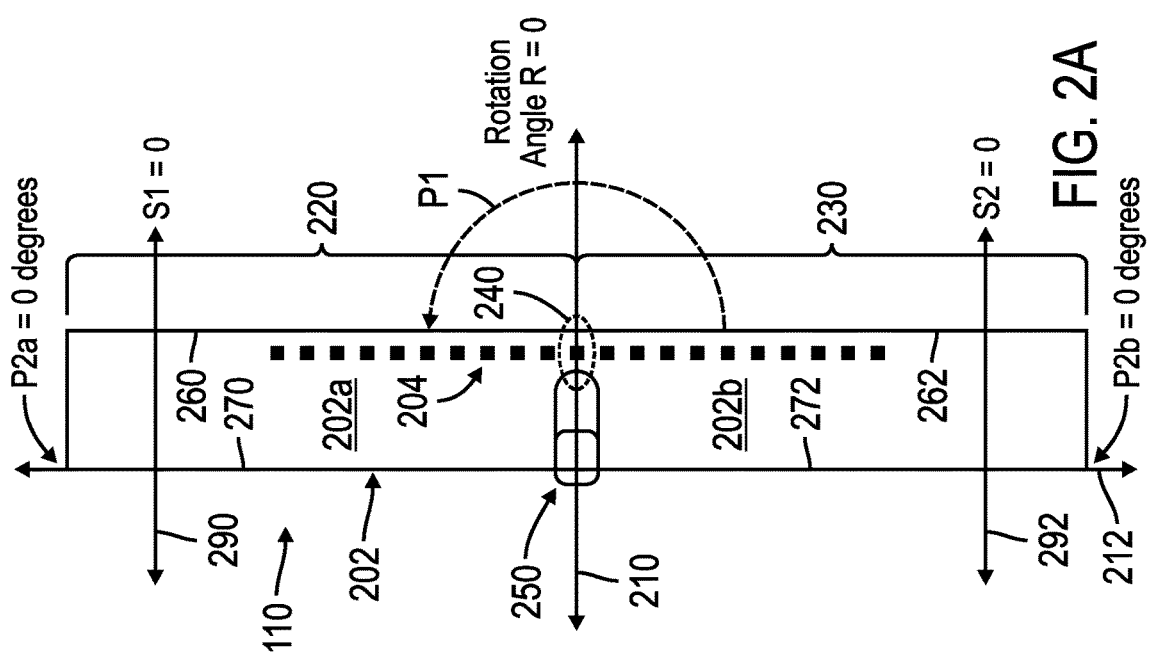

FIGS. 2A-2E depict schematic views of one embodiment of a segmented tape head module 110 in accordance with the present description. The tape head module 110 has a longitudinal-shaped beam 202 which carries arrays of transducers including reader, writer and servo arrays of transducers. For simplicity sake a portion of one such array of reader transducers is indicated at 204. The beam 202 provides a structural substrate for supporting the arrays of transducers and may be made of a ceramic material for example, but it is appreciated that other materials may be used, depending upon the particular application. The longitudinal-shaped beam 202 defines a transverse axis 210 of the segmented tape head module 110, which is generally orthogonal to a longitudinal axis 212 of the tape head module 110 as shown in FIG. 2A.

In one aspect of a segmented tape head module 110 in accordance with the present description, the tape drive 100 may be operated in various pivotal orientations of pivotally coupled tape head module segments 220, 230 of the tape head module 110. The tape head module segments 220, 230 each include a beam segment 202a, 202b of the beam 202. The beam segments 202a, 202b are pivotally coupled to each other by a hinge-like flexural region 240 of the beam 202 which functions as a living hinge guiding the relative pivotal motion between the beam substrate segment members 202a, 202b. In one embodiment, the flexural region 240 includes a flexible substrate material coupling the beam substrate segment members 202a, 202b together and configured for flexing to bend the beam substrate 202 between the beam substrate segment members 202a, 202b to guide the relative pivotal motion between the beam substrate segment members 202a, 202b.

Each tape head module segment 220, 230 includes sub-arrays of the array 204 reader, writer and servo transducers supported by the beam segment of the particular module beam segment. For purposes of clarity, just the transducers 204 are depicted. The hinge-like flexural region 240 of the beam structure 242 is also referred to herein as the flexural hinge or flexural hinge member 240. The tape head module segments 220, 230 of the tape head module 110 are actuated between various pivot angles P1 by a controllable pivot actuator 250 engaging the flexural hinge 240. In one embodiment, the members 202a, 202b, 240 are formed integrally with each other. In other embodiments, two or more of the members 202a, 202b, 240 may be separate components assembled within the beam 202.

A pivotal orientation of the tape head module segments 220, 230 is represented by a pivot angle P1 which is defined in FIGS. 2A-2E by the angle between the leading faces 260, 262 of the tape head module segments 220,230, respectively. In the pivotal orientation depicted in FIG. 2A, the leading faces 260, 262 of the tape head module segments 220, 230, respectively, are generally coplanar with each other and generally parallel to the longitudinal axis 212 of the tape head module 110. Accordingly, in the pivotal orientation of FIG. 2A, the tape head module 110 has a pivot angle P1=180 degrees between the leading faces 260, 262 of the tape head module segments 220,230, respectively.

The pivotal orientation of the tape head module segments 220, 230 is also represented by pivot angles P2a and P2b, of the tape head module segments 220, 230, respectively. The pivot angle P2a is defined in FIGS. 2A-2E by the angle between the trailing face 270 of the tape head module segment 220 and the longitudinal axis 212 of the tape head module 110.

Similarly, the pivot angle P2b is defined in FIGS. 2A-2E by the angle between the trailing face 272 of the tape head module segment 230 and the longitudinal axis 212 of the tape head module 110. In the pivotal orientation depicted in FIG. 2A, the trailing faces 270, 272 of the tape head module segments 220, 230, respectively, are generally coplanar with each other and generally parallel to the longitudinal axis 212 of the tape head module 110. Accordingly, in the pivotal orientation of FIG. 2A, the tape head module 110 has pivot angles P2a=0 degrees and P2b=0 degrees, for the trailing faces 270, 272, respectively, of the tape head module segments 220, 230, respectively.

By comparison, in the pivotal orientation depicted in FIG. 2B, the leading faces 260, 262 of the tape head module segments 220, 230, respectively, are not coplanar with each other and are not parallel to the longitudinal axis 212 of the tape head module 110. In this example, the pivot actuator 240 has pivoted the tape head module segments 220, 230 relative to each other so that the tape head module 110 has a pivot angle P1=176 degrees, for example, between the leading faces 260, 262 of the tape head module segments 220, 230, respectively, in the pivotal orientation of FIG. 2B. Similarly, in the pivotal orientation depicted in FIG. 2B, the trailing faces 270, 272 of the tape head module segments 220, 230, respectively, are not coplanar with each other and are not parallel to the longitudinal axis 212 of the tape head module 110. In this example, the tape head module 110 has pivot angle P2a=−2 degrees, between the longitudinal axis 212 of the segmented tape head module 110, and the trailing face 270 of the tape head module segment 220 in the pivotal orientation of FIG. 2B. Similarly, the tape head module 110 has a pivot angle P2b=+2 degrees, for example, between the tape head longitudinal axis 212 and the trailing face 272 of the tape head module segment 230. As used herein, angles such as the pivot angle 2b are measured in a counter-clockwise direction from the longitudinal axis 212 and are assigned a positive value. Conversely, angles such as angle P2a of FIG. 2B measured in a clockwise direction from the longitudinal axis 212 are assigned a negative value. It is seen that each of the pivot angles P2a, P2b, is a function of the pivot angle P1 where |P2a|=P2b and that pivot angle P2b is the complement of half P1 or:

$$|P2a|=P2b=90-((P1)/2). \qquad (1)$$

In the illustrated embodiment, the tape head module segments 220, 230 pivot evenly about the transverse axis 210 at the flexural region 240. As a consequence, pivot angles P2a and P2b have the same magnitude but opposite signs since they pivot in opposite directions. However, it is appreciated that in other embodiments, the tape head module segments 220, 230 may be actuated to pivot separately and/or in unequal amounts, and/or in the same or different pivotal directions, depending upon the particular application. As a consequence, pivot angles P2a and P2b may the same or different magnitudes and may have the same or different signs in such embodiments. For skew-based TDS compensation, the tape drive 100 (FIG. 1) is, in one embodiment, operated so that the segmented tape head module 110 has a nominal or overall, non-zero rotation angle R (FIG. 2C) such as R=7.5 degrees, for example, relative to the longitudinal direction of tape travel which is parallel to an x axis of an x-y coordinate system in the plane of the face of the tape 122 as shown in FIG. 2B. The y axis is orthogonal to the x axis and extends vertically and between the top and bottom edges, 280, 282 (FIG. 2C), respectively, of the tape 122.

As used herein, a rotation angle R that is in a counter-clockwise direction relative to the longitudinal direction of tape travel is expressed as a positive value, such as a counter-clockwise rotation angle R=+7.5 degrees, for example, as viewed from the tape bearing surface of the head. Conversely, a rotation angle that is in a clockwise direction relative to the longitudinal direction of tape travel is expressed as a negative value, such as a clockwise rotation angle R=−7.5 degrees, for example, as viewed from the tape bearing surface of the head. Thus, a tape head rotated at an angle of R=−7.5 degrees is rotated at an angle of 7.5 degrees, but in a clockwise direction relative to the longitudinal direction of tape travel.

Figure 2C:
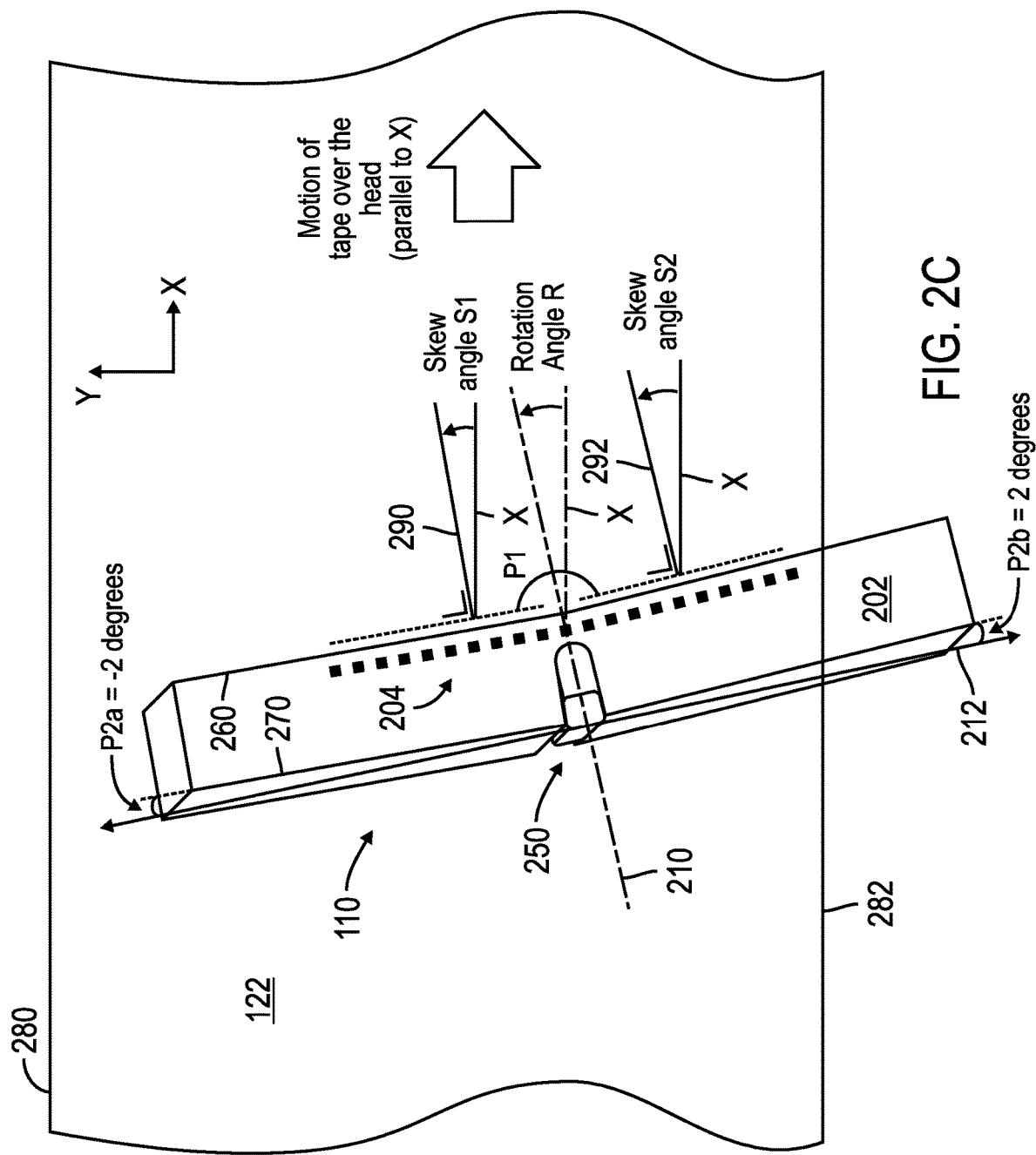

The rotation angle R is depicted in FIG. 2C as the angle R between the transverse axis 210 of the tape head module 110 and the longitudinal direction of tape travel parallel to the x axis in FIG. 2A. As best seen in FIG. 2C, the tape head module 110 is actuated between various rotation angles R by the actuator 132 (FIG. 1) to achieve one component of segmented tape head, active skew-based TDS compensation in accordance with the present description as explain in greater detail below.

Furthermore, in one embodiment, the tape head module segments 220, 230 of the tape head module 110 are actuated between various pivot angles P1 by the pivot actuator 250 engaging the flexural hinge 240 as described above, to achieve another component of segmented tape head, active skew-based TDS compensation in accordance with the present description. As explained in greater detail below, as a result of controlling both the overall rotation angle R of the tape head module 110 and also the pivot angle P1 between pivotally coupled segments 220, 230 of the tape head module 110, each tape head module segment 220, 230 may have an independently adjustable skew angle S1, S2, respectively, relative to the longitudinal direction of tape travel as shown in FIG. 2C.

In one embodiment, the skew angle S1 of the tape head module segment 220 is the angle between the longitudinal direction of tape travel as represented by the x axis, and an axis 290 orthogonal to the leading face 260 of the tape head module segment 220. Similarly, the skew angle S2 of the tape head module segment 230 is the angle between the longitudinal direction of tape travel as represented by the x axis, and an axis 292 orthogonal to the leading face 262 of the tape head module segment 230.

In one aspect of segmented tape head skew-based TDS compensation in accordance with the present description, the independently adjustable skew angles S1, S2 of the tape head module segments 220, 230, respectively, are each a function of both the rotational orientation of the tape head module 110 and the pivotal orientation of the segments of the tape head module 110. In one embodiment, the skew angle S1 of the tape head module segment 220 is provided as:

$$S1=R+P2a \qquad (2)$$

and the skew angle S2 of the tape head module segment 230 is provided as:

$$S2=R+P2b. \qquad (3)$$

In the rotational orientation of FIG. 2A, the transverse axis 210 of the tape head module 110 is parallel to the longitudinal direction of tape travel as represented by the x axis. Hence, the rotation angle R of the tape head module 110 is R=0 degrees in FIG. 2A. Furthermore, in the pivotal orientation depicted in FIG. 2A for the tape head module 110, the segments 220, 230 of the tape head have a pivot angle P1=180 degrees and pivot angles |P2a|=P2b|=0 degrees as described above. Accordingly, the transverse axis 290 of the segment 220 of the tape head module 110 is parallel to the longitudinal direction of tape travel as represented by the x axis. Hence, the skew angle S1 of the tape head module segment 220 matches the pivot angle P2a when the rotational angle R=0, such that skew angle S1=0 degrees in FIG. 2A. Substituting rotation angle R=0 and pivot angle P2a=0 in equation 2 above, provides the same result, that is, S1=R+P2a=0+0=0. Similarly, the transverse axis 292 of the segment 230 of the tape head module 110 is parallel to the longitudinal direction of tape travel as represented by the x axis. Hence, the skew angle S2 of the tape head module segment 230 matches the pivot angle P2b when the rotational angle R=0, such that the skew angle S2 is also equal to 0 degrees in FIG. 2A. Substituting rotation angle R=0 and pivot angle P2b=0 in equation 3 above, provides the same result, that is, skew angle S2=R+P2b=0+0=0 degrees.

In the rotational orientation of FIG. 2B, the transverse axis 210 of the tape head module 110 is again parallel to the longitudinal direction of tape travel as represented by the x axis. Hence, the rotation angle R of the tape head module 110 remains R=0 degrees in FIG. 2B. As noted above, the skew angle S1 of the tape head module segment 220 matches the pivot angle P2a when the rotational angle R=0. In the pivotal orientation depicted in FIG. 2B for the tape head module 110, the segments 220, 230 of the tape head have a pivot angle P1=176 degrees, pivot angle P2a=−2 degrees and pivot angle P2b=+2 degrees as described above. Accordingly, the transverse axis 290 of the segment 220 of the tape head module 110 is not parallel to the longitudinal direction of tape travel as represented by the x axis. Instead, the transverse axis 290 of the segment 220 of the tape head module 110 is pivoted relative to the longitudinal direction of tape travel at the skew angle S1 which matches the pivot angle P2a=−2 degrees such that skew angle S1=−2 degrees in FIG. 2A. Substituting rotation angle R=0 and pivot angle P2a=−2 degrees in equation 2 above, provides the same result, that is, skew angle S1=R+P2a=0+(−2)=−2 degrees.

Similarly, the skew angle S2 of the tape head module segment 230 matches the pivot angle P2b when the rotational angle R=0. As noted above, in the pivotal orientation depicted in FIG. 2B for the tape head module 110, the segment 230 of the tape head has a pivot angle P2b=+2 degrees. Accordingly, the transverse axis 292 of the segment 230 of the tape head module 110 is not parallel to the longitudinal direction of tape travel as represented by the x axis. Instead, the transverse axis 292 of the segment 230 of the tape head module 110 is pivoted relative to the longitudinal direction of tape travel at the skew angle S2 which matches the pivot angle P2b=+2 degrees such that skew angle S2=+2 degrees in FIG. 2B. Substituting rotation angle R=0 and pivot angle P2b=+2 degrees in equation 3 above, provides the same result, that is, skew angle S2=R+P2b=0+ 2=2 degrees.

In the rotational orientation of FIG. 2C, the transverse axis 210 of the tape head module 110 is not parallel to the longitudinal direction of tape travel as represented by the x axis. Instead, the transverse axis 210 of the tape head module 110 has been rotated at a rotational angle R=7 degrees in this example. FIG. 2C depicts a pivotal orientation of the tape head module segments 220, 230 which is the same as that of the tape head of FIG. 2B except that the rotational angle R=0 in FIG. 2B and R=7 degrees in FIG. 2C. Thus, in the pivotal orientation depicted in FIG. 2C for the tape head module 110, the segments 220, 230 of the tape head have a pivot angle P1=176 degrees, pivot angle P2a=−2 degrees and pivot angle P2b=2 degrees as described above.

In the example of FIG. 2C, the segment 220 of the tape head module 110 has not only been rotated in the counter-clockwise direction at a rotational angle R=7 degrees, but also pivoted in a clockwise direction at a pivot angle of P2a=−2 degrees. Substituting rotation angle R=7 degrees and pivot angle P2a=−2 degrees in equation 2 above, provides the net effect of the rotational and pivotal motion, that is, a skew angle S1=R+P2a=7+(−2)=5 degrees. Thus, the transverse axis 290 of the segment 220 of the tape head module 110 is not parallel to the longitudinal direction of tape travel as represented by the x axis. Instead, the transverse axis 290 of the segment 220 of the tape head module 110 is skewed relative to the longitudinal direction of tape travel at the skew angle S1=5 degrees.

Similarly, the segment 230 of the tape head module 110 has been both rotated in a counter-clockwise direction to a rotational angle R=7 degrees, and also pivoted in a counter-clockwise direction by an additional pivot angle of P2b=+2 degrees in this example. Substituting rotation angle R=7 degrees and pivot angle P2b=+2 degrees in equation 3 above, provides the net effect of the rotational and pivotal motion, that is, a skew angle S2=R+P2b=7+(+2)=9 degrees. Thus, the transverse axis 292 of the segment 230 of the tape head module 110 is not parallel to the longitudinal direction of tape travel as represented by the x axis. Instead, the transverse axis 292 of the segment 230 of the tape head module 110 is skewed relative to the longitudinal direction of tape travel at the skew angle S2=9 degrees.

It is seen from the above that a segmented tape head in accordance with the present description can provide for each segment of the tape head, an independently adjustable skew angle with respect to the direction of travel of tape. Thus, in the example of FIG. 2B, the tape head module segments 220, 230 have skew angles S1, S2 equal to minus 2 degrees and plus 2 degrees, respectively. These skew angles are equal in magnitude but are in opposite directions.

By comparison, in the example of FIG. 2C, the tape head module segments 220, 230 have skew angles S1, S2 equal to +5 degrees and +9 degrees, respectively. These skew angles are unequal in magnitude but are in the same direction. By varying the angle of rotation R and varying the pivot angles P2a and P2b, independently adjustable skew angles of appropriate magnitudes and directions may be obtained for the tape head. As explained in greater detail below, such independently adjustable skew angles of a segmented tape head in accordance with the present description, can improve active TDS compensation with a more accurate, piecewise linear approximation of a nonlinear deformation field in the tape.

Figure 3:
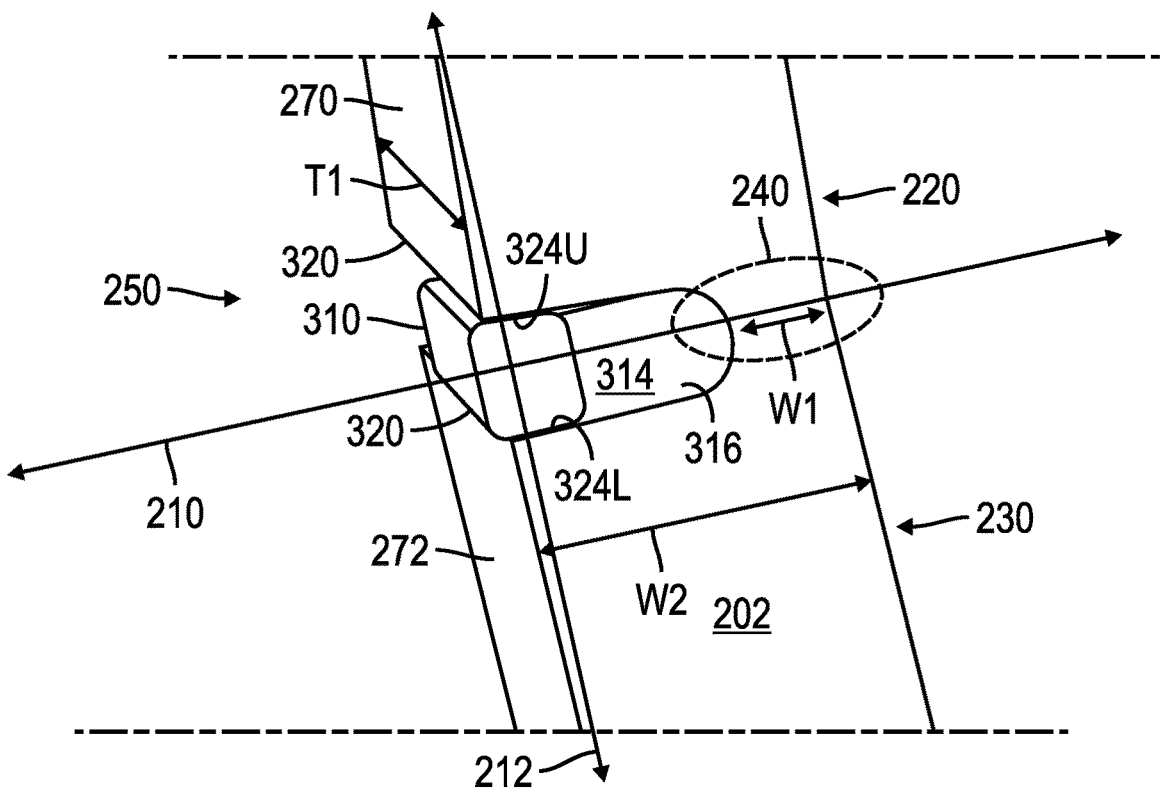
FIG. 3 is a schematic diagram depicting one embodiment of a pivotal actuator of a segmented tape head module in accordance with one embodiment of the present disclosure.

FIG. 3 depicts one embodiment of the pivot actuator 250 in greater detail. Transducers have been omitted from the module segments for clarity purposes. In this example, the pivot actuator 250 includes an expansion element 310 disposed within a notch 314 formed within the tape head beam 202 and extending along the transverse axis 210 into the flexural region 240 of the tape head module 110. The notch 314 is defined by a concave-shaped wall 316 and extends through the entire thickness of the beam 202 as represented by the arrow T1 in FIG. 3, The wall 316 of the notch 314 defines an opening 320 in the trailing faces 270, 272 of the beam 202, in which the expansion element 310 is disposed. The notch 314 extends adjacent to the flexural hinge region 240 of the beam substrate 202 so that the flexural hinge region 240 has a reduced width W1 as compared to a beam substrate width W2. The notch 314 may be formed by any suitable process such as machining by abrasion or cutting by laser, for example.

Figure 2D:
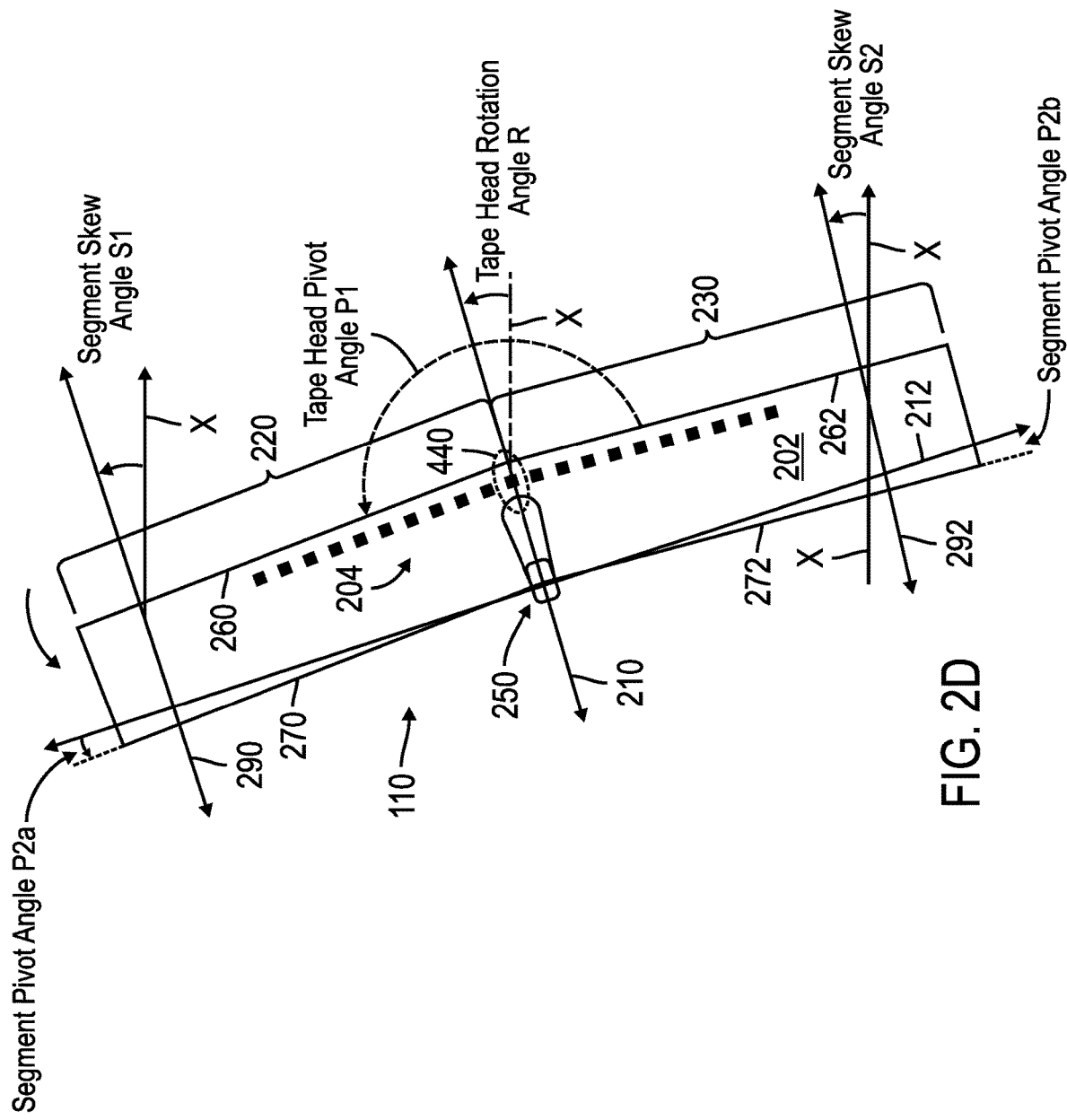

In one embodiment, the expansion element 310 is a piezo such as a piezo stack which is secured within the notch opening 320 to upper and lower walls 324U, 324L, respectively, of the notch 314. Upon the application of appropriate voltage or other control signal through the piezo stack expansion element 310, the piezo stack expansion element 310 expands and actuates the upper and lower walls 324U, 224L, which widens the opening 320 of the notch 314, thereby causing the tape head module segments 220, 230 to pivot about the flexural hinge 240 towards each other as shown in FIGS. 2B, 2C. Conversely, the piezo stack expansion element 310 can be caused by the application of appropriate control signals through the piezo stack expansion element 310, to contract which narrows the opening 320 of the notch 314, thereby causing the tape head module segments 220, 230 to pivot about the flexural hinge 240 away each other as shown in FIG. 2D, for example. In this manner, the piezo 310 is configured to selectively expand and contract to control the relative pivotal motion between the beam substrate segment members and hence the pivot angle P1 between module segment members 220, 230.

The value of the pivot angle P1 and hence the values of the pivot angles P2a, P2b for the tape head module 110 may be selected as a function of the appropriate control signals through the piezo stack expansion element 310. The range of possible pivot angles is a function of the expansion-contraction range of motions of the piezo stack element 310.

Figure 2E:
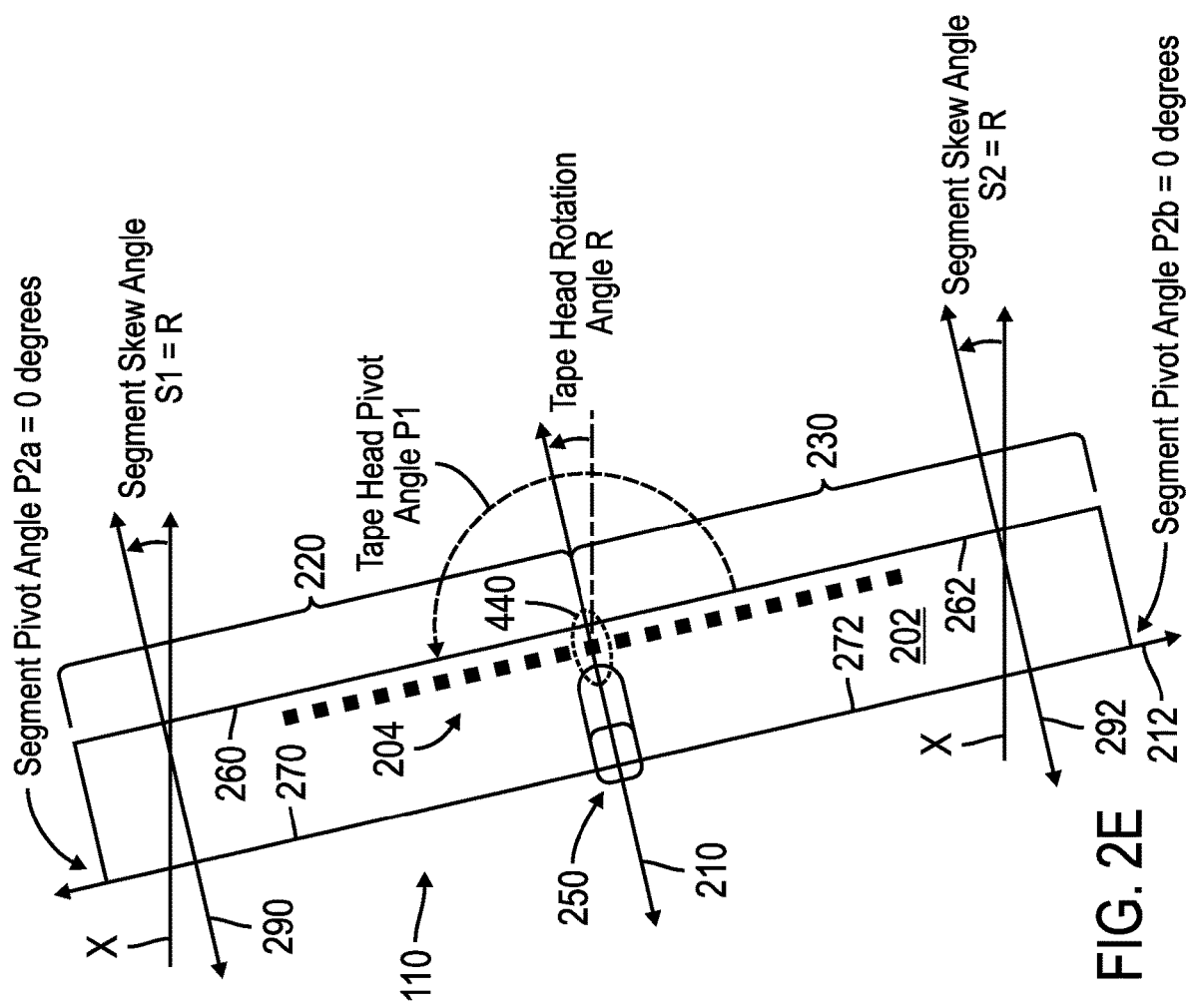

In addition, the flexural hinge 240 may be biased in such a manner that the tape head module segments 220, 230a return to a particular pivot angle P1 in the absence of an applied control signal to the piezo stack expansion element 310. For example, in one embodiment, the flexural hinge 240 may be biased to cause the tape head module segments 220, 230a to return to the pivot angle P1=180 degrees as shown in FIG. 2E, in the absence of an applied control signal to the piezo stack expansion element 310. In the pivot position depicted in FIG. 2E, the skew angles S1, S2 of the module segments 220, 230, respectively, are the same, that is, S1=S2=R, the rotation angle of the module 110. It is appreciated that other biases including no bias may be selected for the flexural hinge 240, depending upon the particular application.

It is further appreciated that other types of expansion elements 310 may be utilized in a pivot angle actuator, depending upon the particular application. For example, FIGS. 4A-4D depict a pivot actuator 250a which includes a thermal expansion element 310a which expands when heated and contracts when cooled. To fabricate the pivot actuator 250a, the thermal expansion element 310a in the fully contracted (cold) state is secured to the lower wall 324L of the opening 320 of the notch 314 of the beam 202 as shown in FIG. 4A. The flexural hinge 240 of the tape head 310 is flexed causing the tape head module segments 220, 230 to pivot about the flexural hinge 240 and partially close the opening 320 of the notch 314 to a pivot position depicted in FIG. 4B having a pivot angle P1>180 degrees. In this pivot position, the thermal expansion element is also secured to the upper wall 324U of the opening 320 of notch 314. In this manner, the flexural hinge 340 of the tape head module 110 is preloaded with tension when the thermal expansion element 310a in the fully contracted (cold) state for example.

Upon the application of appropriate electrical current or other control signals through the thermal expansion element 310a, thermal expansion element 310a expands, which widens the opening 320 of the notch 314, thereby causing the tape head module segments 220, 230 to pivot about the flexural hinge 240. FIG. 4C shows an example in which the thermal expansion element 310a is partly expanded. In this example, the flexural hinge 240 of the tape head 310 is flexed by the partial expansion of the thermal expansion element, causing the tape head module segments 220, 230 to pivot about the flexural hinge 240 and further open the opening 320 of the notch 314 to a pivot position depicted in FIG. 4C having a pivot angle P1=180 degrees, for example.

FIG. 4D shows an example in which the thermal expansion element 310a is more fully expanded. In this example, the flexural hinge 240 of the tape head 310 is flexed by the further expansion of the thermal expansion element, causing the tape head module segments 220, 230 to pivot about the flexural hinge 240 and further open the opening 320 of the notch 314 to a pivot position depicted in FIG. 4D having a pivot angle P1<180 degrees, for example.

In a manner similar to that described above for the piezo stack expansion element 310 (FIG. 3), the value of the pivot angle P1 and hence the values of the pivot angles P2a, P2b (FIGS. 2B-2E) for the tape head module 110 may be selected as a function of the appropriate control signal through the thermal expansion element 310a. The range of possible pivot angles is a function of the expansion-contraction range of motions of the thermal expansion element 310a. In addition, the flexural hinge 240 may be biased in such a manner that the tape head module segments 220, 230a return to a particular pivot angle P1 in the absence of an applied control signal to the thermal expansion element 310, such as the pivot angle depicted in FIG. 4A, for example. In this manner, the thermal actuator 310a is configured to engage the notch wall 316 of the beam substrate 202 and selectively expand and contract the opening 320 of the beam substrate notch 314 to control the relative pivotal motion between the beam substrate segment members 202a, 202b.

It is seen from the above that a segmented tape head module 110 in accordance with the present description can provide adjustable pivot angles between segments of the tape head and hence independently adjustable skew angles of the segments of the tape heads. It is recognized that a segmented tape head in accordance with the present description, can improve active TDS compensation with a more accurate, piecewise linear approximation of a nonlinear deformation field in the tape, as described below.

Figure 5:
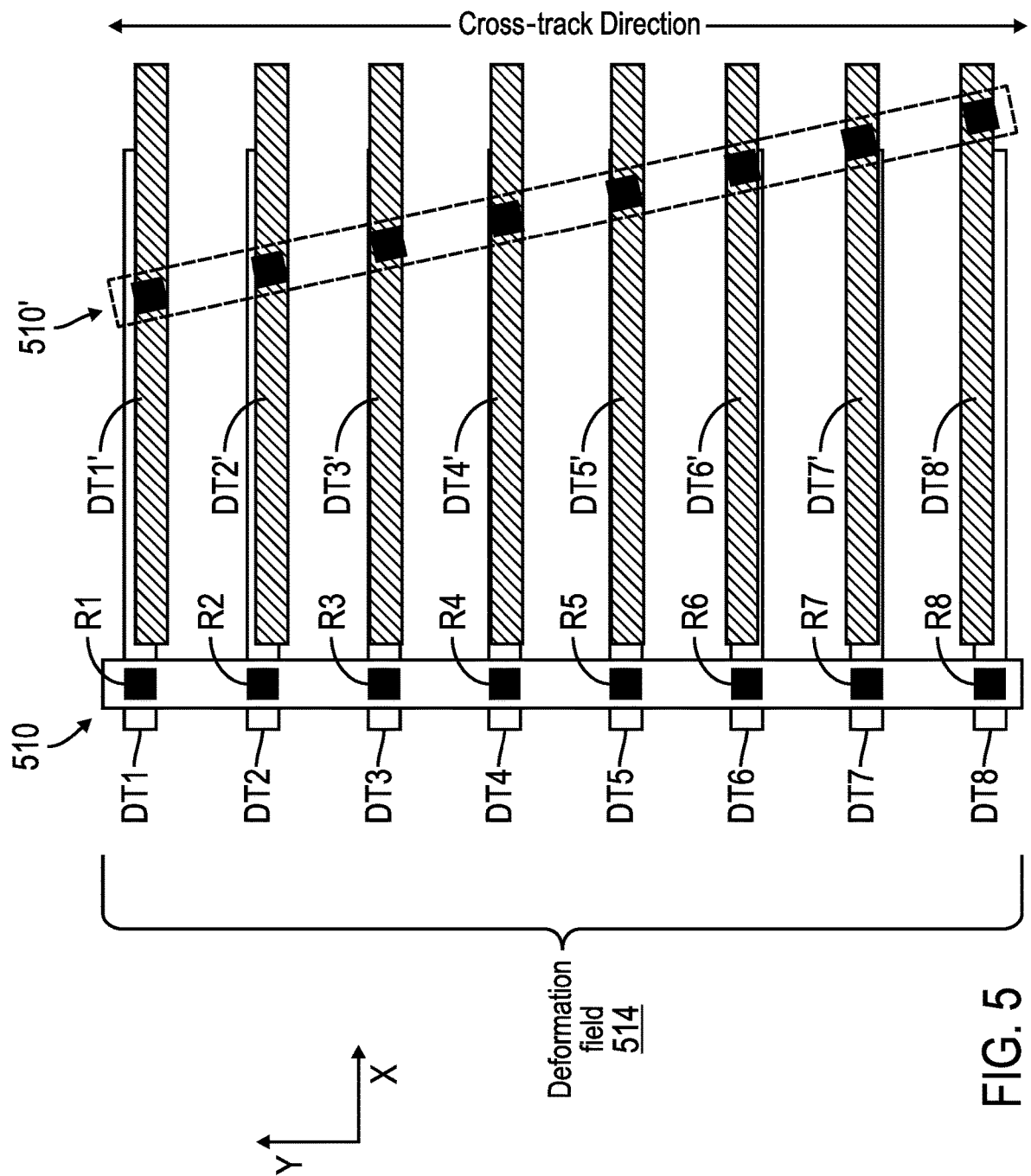
FIG. 5 is a schematic diagram of an example of contraction in a deformation field of a magnetic storage tape and skew-based compensation for contraction in the deformation field.

FIG. 5 shows an example of deformation which can occur in a tape 122 after data tracks have been written on a tape 122. In this example, data tracks DT1, DT2 . . . DT8 are written on a tape 122 by the writer transducers of a tape head 510 shown in phantom. Although the example of FIG. 5 depicts only 8 such data tracks for purposes of clarity, it is appreciated that modern tape drive tape heads frequently can write 16, 32 or more data tracks in each wrap of a data band at a time.

Absent deformation of the tape 122 after the data tracks DT1, DT2 . . . DT8 are written on a tape 122, the reader transducers R1, R2, . . . R8 of the same or similar tape head 510 can be properly aligned or registered with an associated data track DT1, DT2 . . . DT8, respectively, as shown in FIG. 5. In this example, it is assumed that the reader transducers are spaced the same in the cross-track direction (Y axis) and rotationally oriented the same as the writer transducers which originally wrote the tracks. As result, the data may be read from the data tracks DT1, DT2 . . . DT8 without errors due to misregistration between the reader transducers R1, R2, . . . R8 and the data tracks DT1, DT2 . . . DT8.

As previously noted, tape storage media may become deformed due to, for example, changes in tape tension, temperature, humidity, creep and other factors. Such tape deformation, particularly changes in the width of the tape, can cause misregistration between the transducers of the tape head and data tracks previously recorded. In addition, the distance between readers or writer transducers can vary from one tape head to another. Misregistration between the transducers of the tape head and data tracks can cause read errors.

FIG. 5 illustrates one example of the tape 122 contracting in a deformation field 514 of the tape 122 in the cross-track direction after the data tracks DT1, DT2 . . . DT8 have been written on the tape 122. In this example, the cross-track (Y axis) positions of the data tracks DT1, DT2 . . . DT8 have shifted within the deformation field 514 to new positions, as represented in phantom by the shifted position data tracks DT1', DT2' . . . DT8' in FIG. 5. As a result, the reader transducers R1, R2, . . . R8 of the tape head module 110 are not properly registered with the shifted position data tracks DT1', DT2' . . . DT8' as shown in FIG. 5.

Figure 6A:
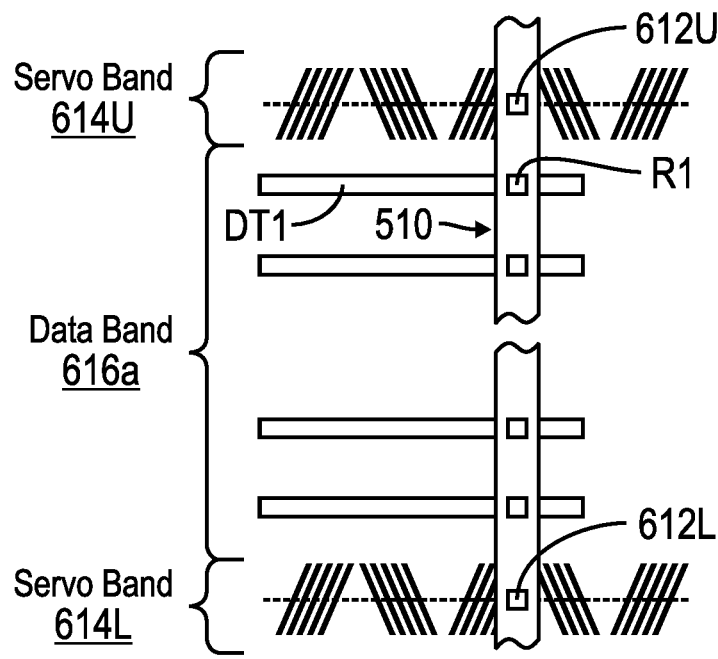
FIG. 6A is a schematic diagram depicting one example of measurement of the contraction of the deformation field of FIG. 5.

In known skew-based TDS compensation techniques, a deformation field may be detected by measuring the width of the tape in real time as the tape moves across the tape head. FIG. 6A depicts a tape head module 510 having 2 servo transducers 612U, 612L that measure the head position using servo bands 614U, 614L on the upper and lower sides, respectively, of the data band 616a being read. Tape dimensional stability, that is, changes in the width of the tape, in this example, are measured by determining the difference between measured Y axis positions of the two servo transducers 612U, 612L relative to the servo bands 614U, 614L on either side of the data band 616a being read. If it is determined that the difference between the measured Y axis positions of the two servo transducers 612U, 612L has grown smaller by a measured differential amount, it is determined that the tape width between the servo bands 614U, 614L has expanded by that differential amount. Conversely, if is determined that the difference between the Y axis positions of the two servo transducers 612U, 612L has grown larger by a differential amount, it is determined that the tape width between the servo bands 614U, 614L has contracted by that differential amount.

Figure 7:
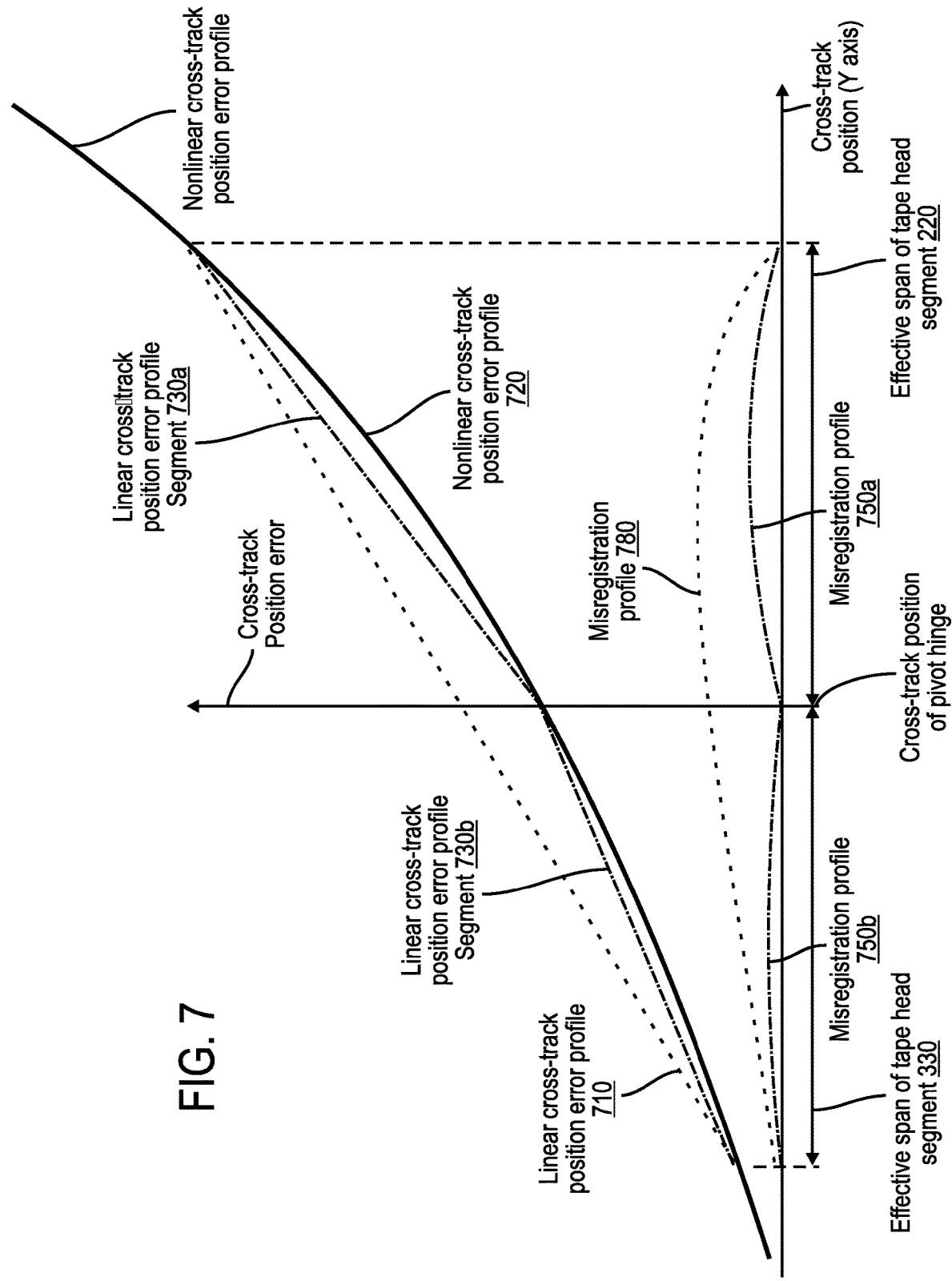
FIG. 7 depicts a graph of examples of profiles of cross-track position errors as a function of cross-track (Y axis) position, due to tape deformation.

In the example of FIG. 5, the cross-track (Y axis) positions of the data tracks DT1, DT2 . . . DT8 have shifted within the deformation field 514 to the shifted position data tracks DT1', DT2' . . . DT8' due to contraction of the tape in the deformation field 514. The shift in the cross-track (Y axis) position of each data track may be expressed as a cross-track position error. FIG. 7 depicts a graph of examples of profiles of cross-track position errors as a function of cross-track (Y axis) position. In the example of FIG. 5, the shift in the cross-track (Y axis) position of each data track of FIG. 5 is represented by a linear cross-track position error profile 710 in FIG. 7. Thus, in this example, the cross-track position error of the data tracks grows in a linear fashion as a function of cross-track Y axis position, due to tape shrinkage in the cross-track (Y axis) direction.

In a known skew-based TDS compensation technique, the shift in the cross-track positions of the data tracks DT1, DT2 . . . DT8 (FIG. 5) to the shifted position data tracks DT1', DT2' . . . DT8' due to contraction of the tape in the deformation field 514, may be compensated by rotating the tape head module 510 to the skewed position represented by the tape head module 510' depicted in phantom in FIG. 5. The angle at which the tape head module 510' is to be skewed may be determined as a function of the measured change in the y axis positions of the two servo transducers 612U, 612L (FIG. 6A), which measures the amount of contraction of the deformation field 514 (FIG. 5) of the tape 122 as described above.

As a result of rotating the tape head module 510' to this skewed position depicted in FIG. 5, the effective spacing between reader transducers R1, R2 . . . R8 of the tape head module 510' in the cross-track direction may be reduced sufficiently to improve alignment or registration between the reader transducers R1, R2 . . . R8 and the shifted position data tracks DT1', DT2' . . . DT8' as shown in FIG. 5. If registration between the reader transducers R1, R2 . . . R8 and the shifted position data tracks DT1', DT2' . . . DT8' is achieved, read errors due to misregistration between reader transducers and data tracks which have been shifted in cross-track position due to tape shrinkage, can be reduced or eliminated.

However, it is appreciated herein that the shift in the cross-track (Y axis) position of each data track due to contraction or expansion of the tape may be nonlinear in some instances. As noted above, in the linear cross-track position error profile 710 in FIG. 7, the cross-track position error of the data tracks grows in a linear fashion as a function of cross-track Y axis position, due to uniform tape shrinkage (or expansion) in the cross-track (Y axis) direction. By comparison, FIG. 7 also depicts a nonlinear cross-track position error profile 720 in FIG. 7, in which the cross-track position error of the data tracks changes in a nonlinear fashion as a function of cross-track Y axis position, due to nonuniform tape shrinkage (or expansion) in the cross-track (Y axis) direction.

Figure 8:
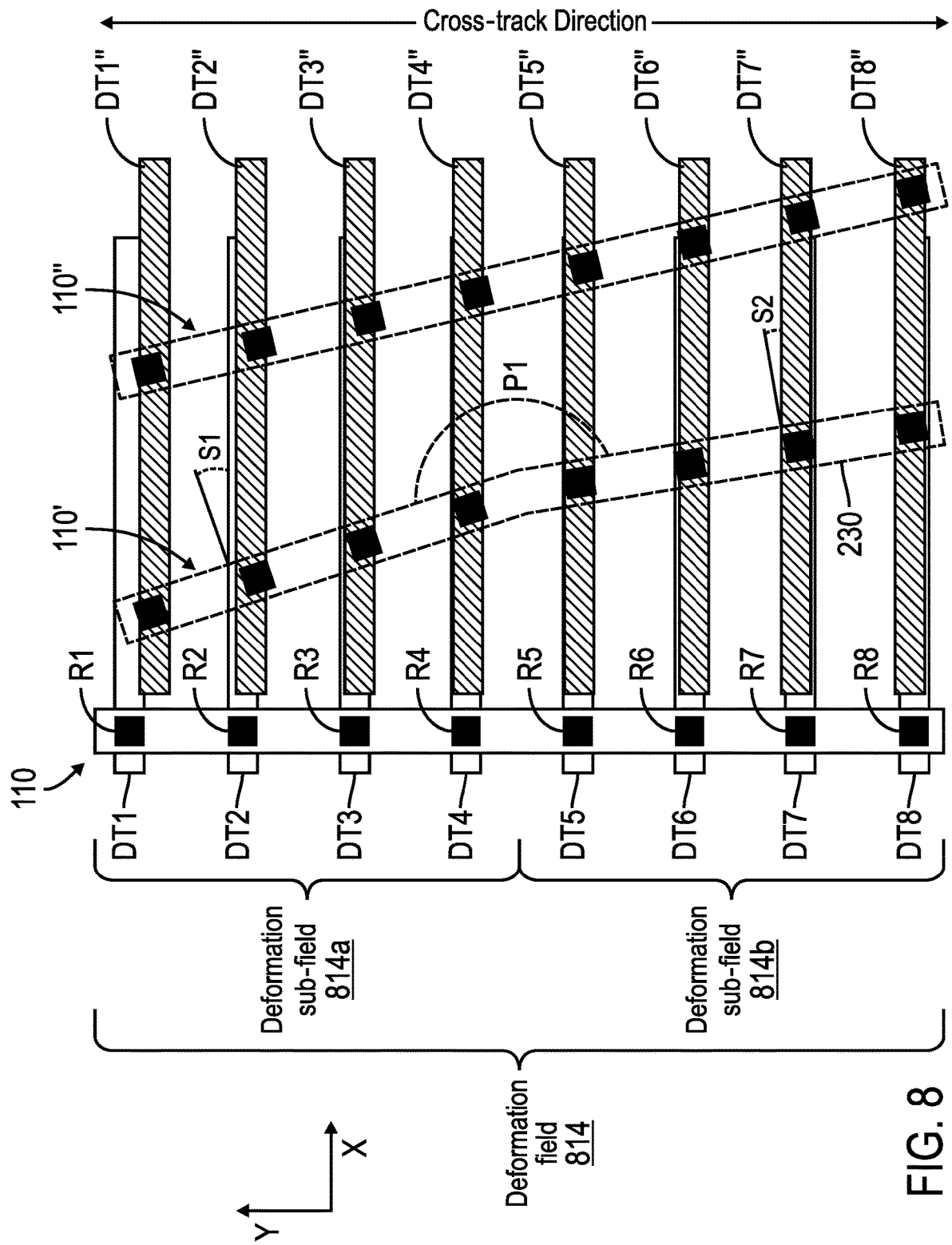
FIG. 8 is a schematic diagram of an example of non-linear tape contractions in a deformation field of a magnetic storage tape and an example of segmented tape head, skew-based compensation for non-linear tape contractions in the deformation field, in accordance with one embodiment of the present description.

In one aspect of segmented tape head skew-based TDS compensation in accordance with the present description, it is appreciated that the nonlinear cross-track position error profile 720 in FIG. 7 may be approximated by a segmented nonlinear cross-track position error profile which comprises two linear cross-track position error profile segments 730a and 730b. FIG. 8 illustrates one example of the tape 122 contracting in a deformation field 814 of the tape 122 in the cross-track direction in a nonlinear fashion after the data tracks DT1, DT2 . . . DT8 have been written on the tape 122. In this example, the cross-track (Y axis) positions of the data tracks DT1, DT2 . . . DT8 have shifted within the deformation field 814 to new positions, as represented in phantom by the shifted position data tracks DT1", DT2" . . . DT8" in FIG. 8. As a result, the reader transducers R1, R2, . . . R8 of the tape head module 110 are not properly registered with the shifted position data tracks DT1", DT2'" . . . DT8" as shown in FIG. 8.

In the example of FIG. 8, the shift in the cross-track (Y axis) position of each data track of FIG. 8 is represented by the nonlinear cross-track position error profile 720 in FIG. 7. Thus, in this example, the cross-track position error of the data tracks changes in a nonlinear fashion as a function of cross-track Y axis position, due to nonlinear tape shrinkage of the deformation field 814 in the cross-track (Y axis) direction of FIG. 8. However, the cross-track position error of the data tracks DT1-DT4 in the deformation sub-field 814a, as indicated by the shifted position data tracks DT1"-DT4", may be approximated by the linear cross-track position error profile segment 730a (FIG. 7) for the deformation sub-field 814a. In a similar manner, the cross-track position error of the data tracks DT5-DT8 (FIG. 8) in the deformation sub-field 814b as indicated by the shifted position data tracks DT5"-DT8", may be approximated by the linear cross-track position error profile segment 730b (FIG. 7) for the deformation sub-field 814b.

In one embodiment of segmented tape head, skew-based TDS compensation in accordance with the present description, the shift in the cross-track positions of the data tracks DT1, DT2, DT3, DT4 to the shifted position data tracks DT1", DT2", DT3", DT4", respectively, due to contraction of the tape in the deformation sub-field 814a, may be compensated independently of the compensation for the shift in the cross-track positions of the data tracks DT5, DT6, DT7, DT8 to the shifted position data tracks DT5", DT6", DT7", DT8", respectively, due to contraction of the tape in the deformation sub-field 814b. More specifically, the contraction in the deformation sub-field 814a may be compensated by rotating the segmented tape head module 110 and pivoting the tape head module segment 220 to the skewed position represented by the skew angle S1 of the segment 220 of the tape head module as represented by the tape head module 110' depicted in phantom in FIG. 8. Similarly, the contraction in the deformation field 814b may be compensated by rotating the tape head module 110 and pivoting the tape head module segment 220 to the skewed position represented by the skew angle S2 of the segment 230 of the tape head module 110' depicted in phantom in FIG. 8.

As discussed above, the skew angle S1 of the tape head module segment 220 can be different from that of the skew angle S2 of the tape head module segment 230. Hence, the skew angles S1, S2 of the tape head module segments of the tape head 110 are independent of each other in one embodiment.

The tape head module segment skew angles S1, S2 for the tape head module segments 220, 230, respectively, are each a function of the rotation angle R (FIG. 2C) and the pivot angle P1 of the tape head as described above in connection with FIG. 2C. The rotation angle R (FIG. 2C) at which the tape head module 110 is to be rotated may be determined as a function of the measured change in the Y axis positions of the two servo transducers 612U, 612L (FIGS. 6A, 6B), which measures the amount of contraction of the overall non-linear deformation field 814 (FIG. 8) of the tape 122 as described above in connection with the linear deformation field 514 (FIG. 5).

In one embodiment, the pivot angle P1 between the tape head module segments at which the module segments 220, 230 are to be pivoted, may be determined as a function of the respective amounts of contraction (or expansion) of the deformation sub-fields 814a, 814b. It is appreciated that these amounts of contraction (or expansion) of the deformation subfield 814a, 814b may be determined utilizing a variety of techniques. For example, if an additional servo reader is positioned at a middle position within the array of transducers to read an additional servo pattern positioned between the two servo patterns shown in FIG. 6A, the deformation of upper and lower segments of a nonlinear deformation field can be determined independently by the positions measured by the upper servo with the middle servo and the positions measured by the middle servo with the lower servo, respectively. Thus, in one aspect of segmented head, skew-based TDS compensation in accordance with the present description, deformation sub-fields within a deformation field may be detected and measured by not only measuring the width of the tape in real time as the tape moves across the tape head, but also measuring the widths of sub-fields within the width of the tape, as the tape moves across the tape head.

Figure 6B:
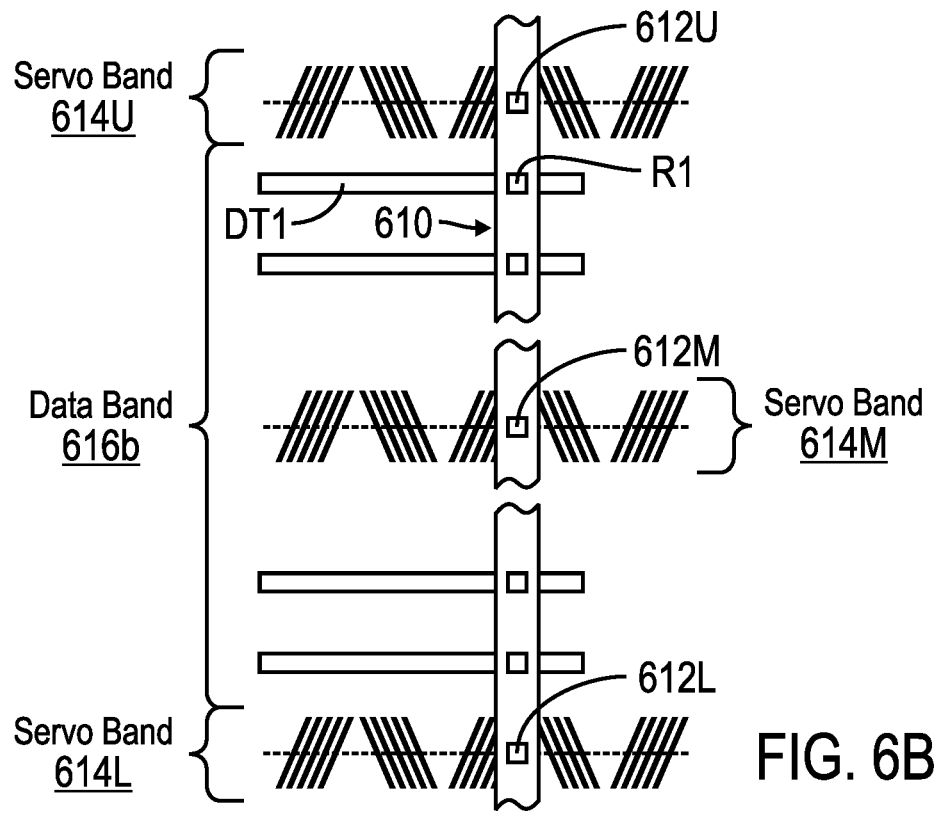
FIG. 6B is a schematic diagram depicting one example of measurement of the contractions of the deformation fields of FIG. 8.

FIG. 6B depicts an example of a segmented tape head module 610 having 2 servo transducers 612U, 612L that measure the head position using servo bands 614U, 614L on the upper and lower sides, respectively, of the data band 616b being read, and a third servo transducer 612M that measures the head position using a third servo band 614M in the middle of the data band 616b being read. Tape dimensional stability, that is, changes in the width of the tape, in this example, are measured by determining the difference between measured Y axis positions of the two servo transducers 612U, 612L relative to the servo bands 614U, 614L on either side of the data band 616b being read. If it is determined that the difference between the measured Y axis positions of the two servo transducers 612U, 612L has grown smaller by a measured differential amount, it is determined that the tape width between the servo bands 614U, 614L has expanded by that differential amount. Conversely, if is determined that the difference between the Y axis positions of the two servo transducers 612U, 612L has grown larger by a differential amount, it is determined that the tape width between the servo bands 614U, 614L has contracted by that differential amount.

Furthermore, tape dimensional stability, that is, changes in the width of the deformation sub-field 814a, in this example, are measured by determining the difference between measured Y axis positions of the two servo transducers 612U, 612M relative to the servo bands 614U, 614M on the upper side and within the center or middle, respectively, of the data band 616b being read. If it is determined that the difference between the measured Y axis positions of the two servo transducers 612U, 612M has grown smaller by a measured differential amount, it is determined that the tape width between the servo bands 614U, 614M has expanded by that differential amount. Conversely, if is determined that the difference between the Y axis positions of the two servo transducers 612U, 612M has grown larger by a differential amount, it is determined that the tape width between the servo bands 614U, 614M has contracted by that differential amount.

Similarly, changes in the width of the deformation subfield 814b, in this example, are measured by determining the difference between measured Y axis positions of the two servo transducers 612M, 612L relative to the servo bands 614M, 614L within the center and on the lower side, respectively, of the data band 616b being read. If it is determined that the difference between the measured Y axis positions of the two servo transducers 612M, 612L has grown smaller by a measured differential amount, it is determined that the tape width between the servo bands 614M, 614L has expanded by that differential amount. Conversely, if is determined that the difference between the Y axis positions of the two servo transducers 612M, 612L has grown larger by a differential amount, it is determined that the tape width between the servo bands 614M, 614L has contracted by that differential amount.

As a result of rotating the tape head module 110' and pivoting the tape head module segments 220, 230, the different skew angles S1 and S2 are achieved for the tape head module segments 220, 230, respectively, as depicted in FIG. 8 for the tape head module 110'. The rotational angle R and the pivotal angle P1 of the segmented tape head may be continuously adjusted as a function of continuous tape width deformation measurements by the servos 614U, 614M, 614L, as the tape moves past the tape head, to continuously adjust the different skew angles S1 and S2 for the tape head module segments 220, 230, respectively, to reduce misregistration between the transducers and the data tracks as depicted in FIG. 8 for the tape head module 110', as data is transferred between the tape head and the data tracks.

Thus, the effective span of the tape head module segment 220 and hence the effective spacing between reader transducers R1, R2, R3, R4 of the tape head module segment 220 in the cross-track direction may be reduced sufficiently by continuous adjustment of the skew angle S1, to improve alignment or registration between the reader transducers R1, R2, R3, R4 and the shifted position data tracks DT1", DT2", DT3", DT4, respectively as shown in FIG. 8. As a result, it is believed that a reduction in read errors due to misregistration caused by tape shrinkage in the deformation sub-field 814a may be achieved. It is believed that an example of a reduction in misregistration for the tape head module segment 220 that may be achieved by continuously positioning the module segment 220 by rotation and pivoting to continuously adjust the skew angle S1, is depicted in a misregistration profile 750a in FIG. 7.

In a similar manner, it is believed that the effective span of the tape head module segment 230 and hence the effective spacing between reader transducers R5, R6, R7, R8 of the tape head module segment 230 in the cross-track direction may be reduced sufficiently by continuous adjustment of the skew angle S2, by the combined rotational and pivotal motions of the segment 230, to improve alignment or registration between the reader transducers R5, R6, R7, R8 and the shifted position data tracks DT5", DT6", DT7", DT8", respectively as shown in FIG. 8. As a result, it is believed that a reduction in read errors due to misregistration caused by tape shrinkage in the deformation field 814b may be achieved. It is believed that an example of a reduction in misregistration for the tape head module segment 230 that may be achieved by continuously positioning the module segment 230 by rotation and pivoting to continuously adjust the skew angle S2, is depicted in a misregistration profile 750b in FIG. 7.

Figure 4B:
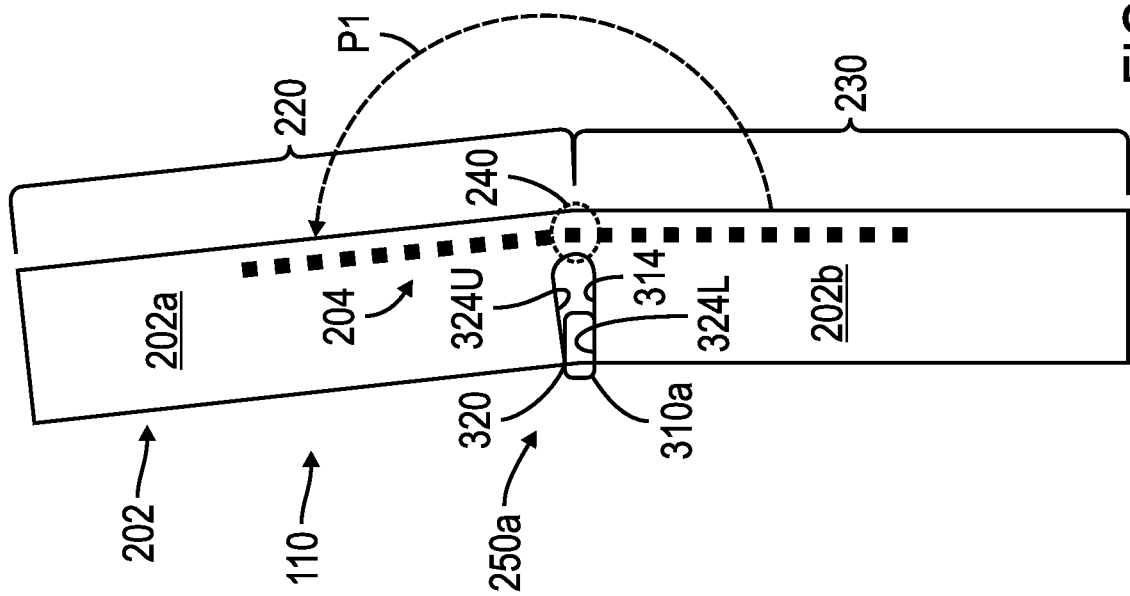
Figure 4A:
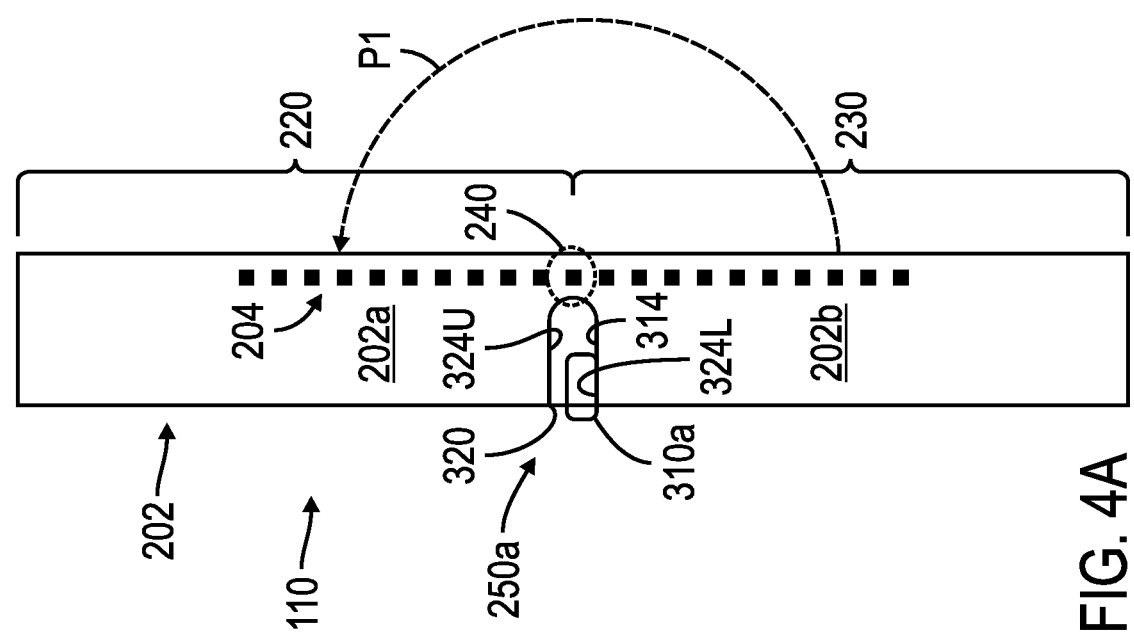

In the example of FIG. 8, the segmented tape head is depicted at 110' having a pivot angle P1>180 degrees, similar to that of the segmented tape heads of FIGS. 2D and 4B. It is appreciated that a segmented tape head may be both rotated and pivoted to other rotation angles and other pivot angles to achieve other independent skew angles to improve registration between transducers and data tracks. By comparison, if a tape head module is merely rotated as represented by the tape head module 110" (FIG. 8) such that the segments 220, 230 are not pivoted relative to each other, the skew angles of the modules 220, 230 will be the same as described above in connection with FIG. 2E, such that the effective spans of the tape head module segments 220, 230 in the cross-track direction will be the same in this example. Hence the effective spacing between all the reader transducers R1, R2, . . . . R8 of the tape head module segments 220, 230 in the cross-track direction will be uniformly reduced. As a result, it is believed that there can be greater misalignment or misregistration between the reader transducers R1, R2, . . . R8 and the shifted position data tracks DT1", DT2" . . . DT8", respectively, for a nonlinear cross-track position error profile such as the nonlinear profile 720, for example. It is believed that an example of a lessened reduction in misregistration for the non-pivoted tape head module segments 220, 230, is depicted in misregistration profile 780 in FIG. 7.

It is seen from the above that a segmented tape head employed in skew-based TDS compensation, can reduce misregistration between tape head readers and data tracks shifted due to non-linear tape deformation by a combination of rotational and pivotal motions of the module segments of the tape head. The rotational angle R and the pivotal angle P1 of the segmented tape head may be continuously adjusted as a function of the tape deformation measurements by servos such as the servos 614U, 614M, 614L, as described above, as the tape moves past the tape head. As a result, it is believed that a significant improvement in read performance may be achieved.

Figure 9:
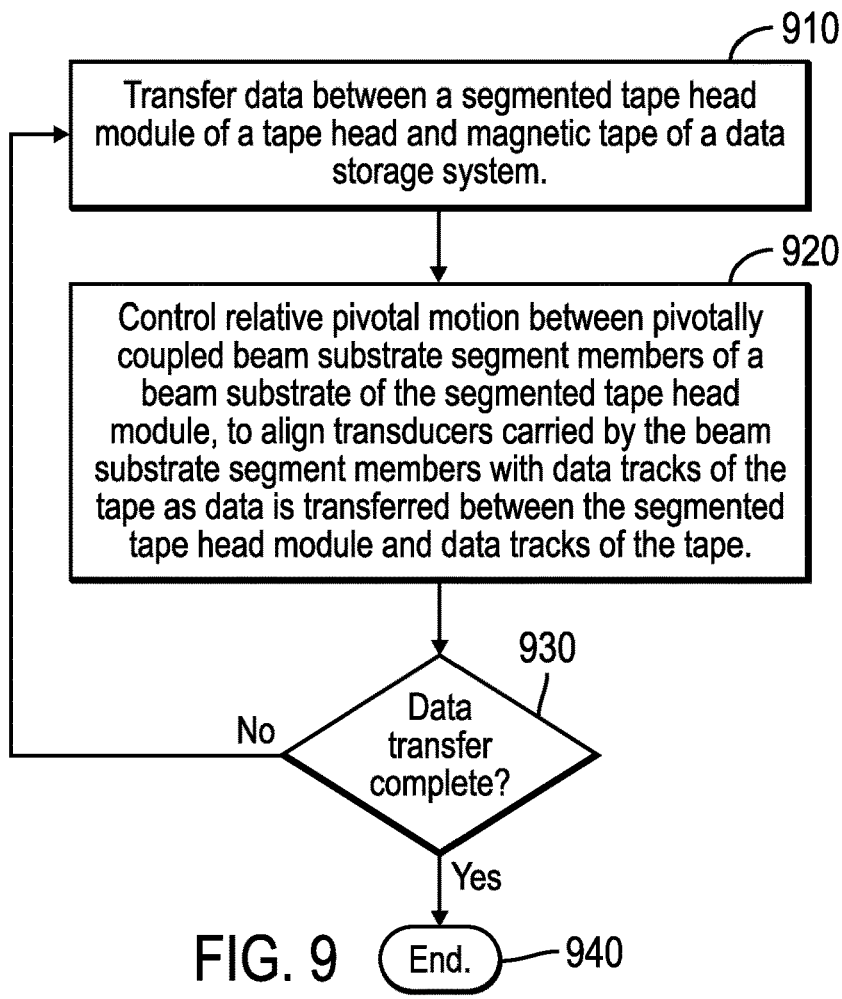
FIG. 9 is an example of operations of a controller employing segmented tape head, skew-based compensation in accordance with one embodiment of the present description.

FIG. 9 depicts one example of operations of a controller of a data storage system employing an embodiment of segmented tape head skew-based TDS compensation in accordance with the present description. In this example, operations of a tape drive controller 128 (FIG. 1) of a tape drive 100 employing one embodiment of segmented tape head compensation in accordance with the present description, is described. It is appreciated that in other embodiments, the operations depicted in FIG. 9 may be carried out by one or more controllers of other computers such as a controller of the host computer 140 (FIG. 1) or a controller of a computer external to both the host 140 and the tape drive 100, for example.

The controller operations of FIG. 9 are represented by blocks 910-940 of FIG. 9. It is appreciated that the number and types of operations of a controller such as, for example, a tape drive controller 128 of a tape drive in accordance with embodiments of the present description, may vary, depending upon the particular application. Furthermore, operations may be performed in sequences other than those depicted in FIG. 9. For example, operations may be performed substantially in parallel, depending upon the particular application.

As shown in FIG. 9, a controller such as the tape drive controller 128 (FIG. 1), for example, transfers (block 910, FIG. 9) data between magnetic tape of a data storage system such as the system 100, for example, and a segmented tape head module of a tape head such as the segmented tape head module 110, for example, in accordance with one aspect of the present description. As used herein data transfer includes at least one of reading data from and writing data to data tracks of the tape. In one embodiment, the data transfer may be initiated in response to a read order request, for example, which may be generated by a host such as the host 140 (FIG. 1), for example.

In an aspect of a segmented tape head compensation in accordance with the present description, a controller such as the tape drive controller 128, for example, controls (block 920, FIG. 9) relative pivotal motion between pivotally coupled beam substrate segment members of a beam substrate of the segmented tape head module, to align transducers carried by the beam substrate segment members with the data tracks of the tape as data is transferred between the tape head module and data tracks of the tape. FIG. 8 shows an example of controlling pivotal motion between pivotally coupled beam substrate segment members of the module segments 220, 230 of the segmented tape head module 110, to align transducers carried by the beam substrate segment members of the module segments 220, 230 with the data tracks of the tape as data is transferred between the tape head module and data tracks of the tape.

A determination is made (block 930, FIG. 9) as to whether the data transfer is complete. If not, the tape drive controller 128 continues to control (block 920, FIG. 9) relative pivotal motion between pivotally coupled module segments 220, 230 (FIG. 8) of the tape head module, to align transducers R1-R8 (FIG. 8) carried by the beam substrate segment members with the data tracks of the tape as data is transferred between the tape head module and data tracks of the tape. Note that the operations 910-930 are repeatedly performed during tape drive operation, such that the pivot angle is constantly being adjusted during read or write operations. In addition, the rotation angle of the tape head module may be continuously modified as the data transfer proceeds as discussed above. Once the data transfer is determined (block 930, FIG. 9) to be complete, the pivotal operations may end (block 940, FIG. 9) in one embodiment. However, if tape transport past the tape head continues after the data transfer is complete, the pivotal operations of block 920 may continue in some embodiments, depending upon the particular application.

Figure 10:
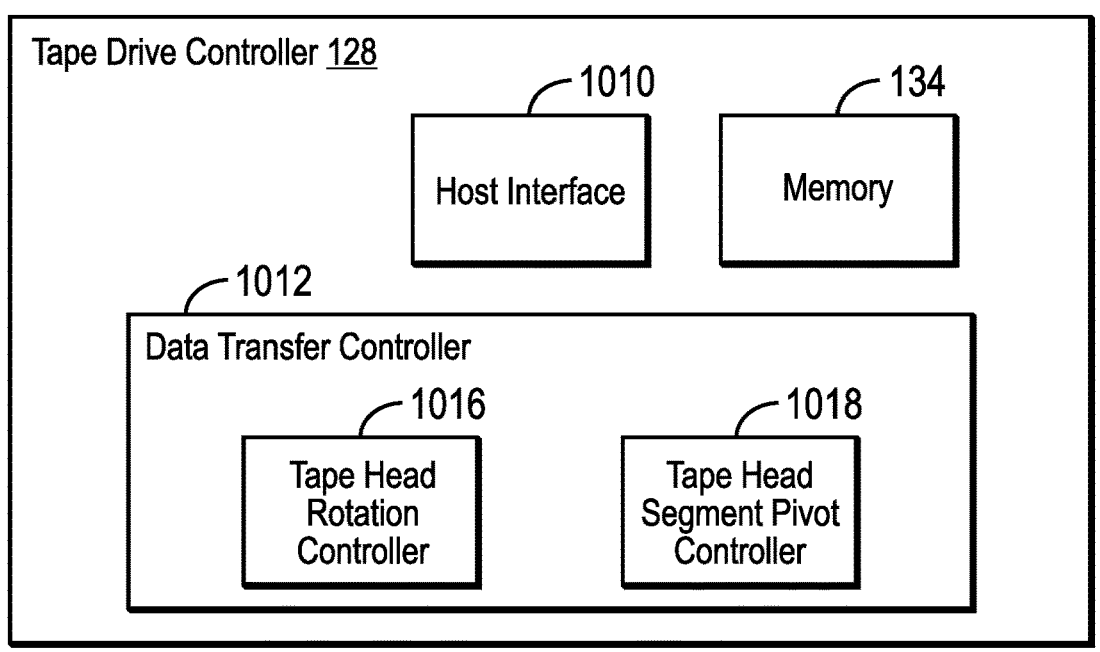
FIG. 10 depicts in greater detail, an embodiment of a tape drive controller of the data storage system of FIG. 1, employing segmented tape head, skew-based compensation in accordance with one embodiment of the present description.

In one embodiment, controlling the relative pivotal motion between beam substrate segment members includes actuating a controllable actuator such as the actuator 250 of FIG. 2C, for example, which is coupled to the beam substrate segment members 202a, 202b of the module. FIG. 10 shows a more detailed example of the tape drive controller 128 for performing the segmented tape head skew-based compensation operations of FIG. 9. In this embodiment, the controller 128 includes a host interface 1010 for receiving a read or write request from the host 140 (or other computer) via the network 150 (FIG. 1). A data transfer controller 1012 controls head functions such as servo following, writing, reading, TDS compensation, etc., during writing and reading operations. Data read from the tape 122 may be stored in the memory 134 before being forwarded to the data requestor via the host interface 1010.

In one embodiment, a tape head rotation controller 1016 of the tape drive controller 128 controls the overall rotation angle R (FIG. 2C) of the tape head module 110 relative to the longitudinal direction of tape travel, as a function of tape width which can vary due to various factors as previously described. In addition, a tape head module segment pivot controller 1018 of the tape drive controller 128 controls (block 920, FIG. 9) the segment pivot angle P1 between pivotally coupled segment members 220, 230 (FIG. 2C) of the segmented tape head module 110 as a function of tape segment widths which can vary due to various factors as previously described. By controlling the rotation angle R (FIG. 2C) of the tape head module 110 relative to the longitudinal direction of tape travel, and by controlling the segment pivot angle P1 between pivotally coupled segment members 220, 230 (FIG. 2C) of the segmented tape head module 110, the skew angles S1, S2 of the module segments 220, 230, respectively, may be independently controlled to compensate for deformation of the tape, such as nonlinear deformation, for example.

As described above in connection with FIGS. 2A-2E above, actuating a pivotal actuator such as the actuator 250 to control (block 920, FIG. 9) the segment pivot angle P1 between pivotally coupled segment members 220, 230 (FIG. 2C) of the segmented tape head module 110 includes, in one embodiment, selectively expanding and contracting an element 310 such as a piezo, for example, to control the relative pivotal motion between the beam substrate segment members. In this example, selectively expanding and contracting a piezo element 310 flexes a flexural hinge member 240 pivotally coupling beam substrate segment members 202a, 202b as a living hinge to guide the relative pivotal motion between the beam substrate segment members 202a, 202b. In one embodiment, flexing the flexural hinge member 240 includes flexing a flexible substrate material of the flexural hinge member to bend the beam substrate between the beam substrate segment members 202a, 202b and to guide the relative pivotal motion between the beam substrate segment members.

As described above in connection with FIG. 3 above, actuating a pivotal actuator such as the actuator 250 to control (block 920, FIG. 9) the segment pivot angle P1 between pivotally coupled segment members 220, 230 (FIG. 2C) of the segmented tape head module 110 includes, in one embodiment, selectively expanding and contracting a beam substrate notch 314 defined by a concave shaped wall 316 adjacent to the flexural hinge member 240 of the beam substrate 202. For example, selectively expanding and contracting the beam substrate notch adjacent to the flexural hinge member includes selectively expanding and contracting a piezo disposed within the beam substrate notch and coupled to the notch wall of the beam substrate to control the relative pivotal motion between the first and second beam substrate segment members.

In an alternative embodiment, the controllable actuator 250 includes a thermal actuator as described above in connection with FIGS. 4A-4D. The thermal actuator is disposed within the beam substrate notch 314 and is configured to engage the notch wall 316 of the beam substrate and selectively expand and contract the beam substrate notch to control the relative pivotal motion between the beam substrate segment members.

Figure 11:
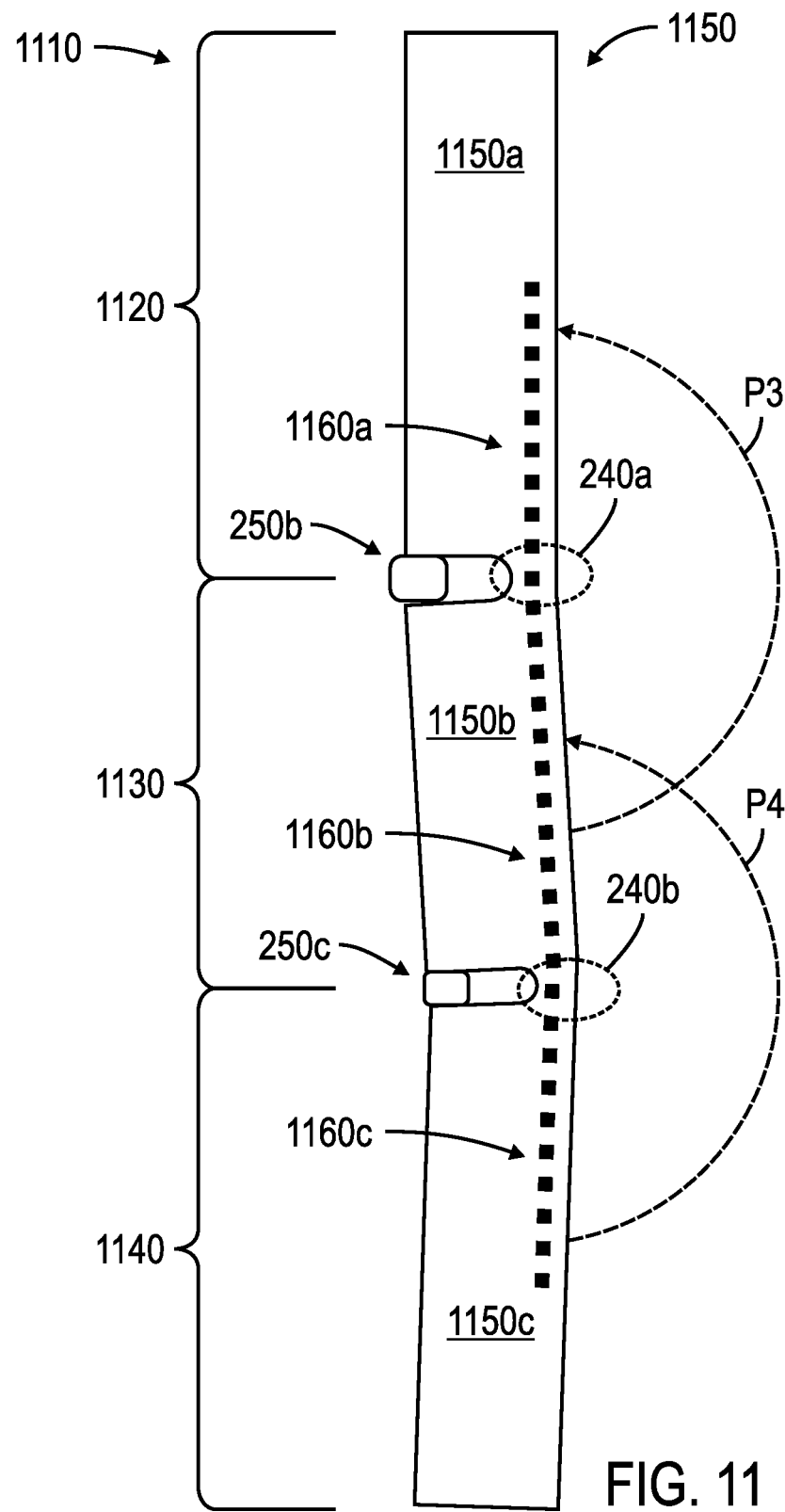
FIG. 11 is a schematic diagram of an example of a segmented tape head module having more than two segments and associated pivotal actuators in accordance with one embodiment of the present disclosure.

It is appreciated that a segmented tape head in accordance with the present description may have more than two module segments, depending upon the particular application. For example, FIG. 11 depicts a segmented tape head module 1110 have three head module segments 1120, 1130 and 1140, each of which has a beam substrate segment 1150a, 1150b, 1150c of a beam substrate 1150 of the module 1110. Each beam substrate segment 1150a, 1150b, 1150c carries a subarray 1160a, 1160b, 1160c, respectively, of an array of transducers of the module 1110. The pair of head module segments 1120 and 1130 are pivotally coupled to each other by a flexural hinge member 240a pivotally coupling the pair of beam segments 1150a, 1150b of the head module segments 1120 and 1130, respectively. The flexural hinge member 240a is flexed by actuation of a controllable actuator 250b adjacent the flexural hinge 240a, causing the tape head module segments 1120, 1130 to pivot about the flexural hinge 240a to a pivot position depicted in FIG. 11 having a pivot angle P3<180 degrees, for example.

Similarly, the pair of head module segments 1130 and 1140 are pivotally coupled to each other by a flexural hinge 240b pivotally coupling the pair of beam segments 1150b, 1150c of the head module segments 1130 and 1140, respectively. The flexural hinge 240b is flexed by actuation of a controllable actuator 250c adjacent the flexural hinge 240b, causing the tape head module segments 1130, 1140 to pivot about the flexural hinge 240b to a pivot position depicted in FIG. 11 having a pivot angle P4>180 degrees, for example. Thus, each controllable actuator 250b, 250c is coupled to a pair of adjacent beam substrate members and configured to control (block 920, FIG. 9) by actuation, relative pivotal motion between adjacent beam substrate segment members of each pair of adjacent beam substrate members.

It is seen from the above that a segmented tape head module 1110 in accordance with the present description can provide multiple, adjustable pivot angles between pairs of segments of the tape head module. As a result, multiple independently adjustable skew angles of the various segments of the tape head module, can be provided to align transducers carried by the beam substrate segment members 1150a, 1150b, 1150c with the data tracks of the tape as data is transferred between the tape head module and data tracks of the tape. It is recognized that a segmented tape head in accordance with the present description, can improve active TDS compensation with a more accurate, multiple piecewise linear approximation of a nonlinear deformation field in the tape.

In a manner similar to that described above in connection with FIG. 6B, additional servo readers may be positioned within the array of transducers to read additional servo patterns positioned within the data band and between the two servo patterns above and below, respectively of the data band. As a result, deformations of three or more sub-fields of a nonlinear deformation field can be determined independently by the cross-track positions measured by each pair of servos of the tape head 1110. Thus, in one aspect of segmented head, skew-based TDS compensation in accordance with the present description, two, three or more deformation sub-fields within a nonlinear deformation field may be detected and measured by not only measuring the width of the tape in real time as the tape moves across the tape head, but also measuring the widths each sub-field within the width of the tape, as the tape moves across the tape head. As a result, the rotation angle and the pivot angles of each pair of module segments may be continuously adjusted to provide independent skew angles for each tape module segment relative to the data tracks of the data band, to improve registration with the data tracks of each sub-field and hence improve data transfer reliability. In the example of FIG. 11, the rotation angle and the pivot angles P3, P4 may be continuously adjusted to provide independent skew angles for each tape module segment 1120, 1130, 1140 relative to the data tracks of the data band, to improve registration with the data tracks of each sub-field and hence improve data transfer reliability.

Figure 12:
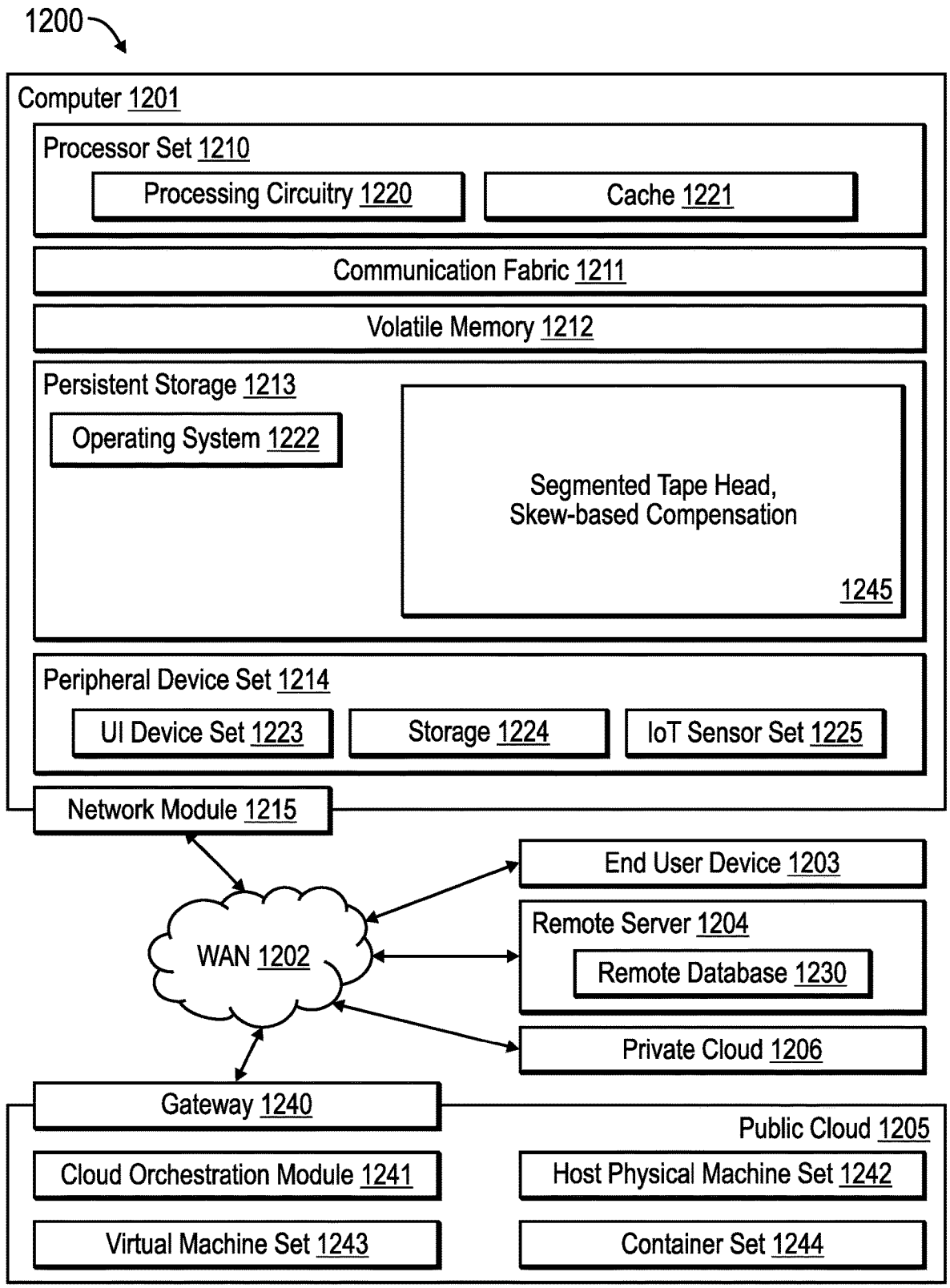
FIG. 12 illustrates an example of a computing environment in which segmented tape head skew-based compensation in accordance with the present description may be employed.

FIG. 12 depicts a computing environment 1200 which contains an example of an environment for the execution of at least some of the computer code involved in performing the inventive methods, including a segmented tape head in accordance with the present description. Computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and block 1201, as identified above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, server, mainframe computer, quantum computer or any other form of computer or mobile device now known or to be developed in the future that is capable of running a program, accessing a network or querying a database, such as remote database 1230. For instance, the computer 1201 may comprise the tape drive controller 128 FIGS. 1, 3 (FIG. 1), or the host 140 (FIG. 1) or computer external to the tape drive 100 or the host 140, alone or in combination. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 101, at least some of the instructions for performing the inventive methods may be stored in persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid-state storage devices. Operating system 1222 may take several forms, such as various known proprietary operating systems or open-source Portable Operating System Interface-type operating systems that employ a kernel. In one embodiment, components of data write manager 1245 in accordance with the present description, includes at least some of the computer code involved in performing the inventive methods, including program components of the controller 128 (FIG. 3) of the tape drive 100 (FIG. 1).

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 includes in one embodiment a tape library such as the tape library 101 (FIG. 1). Storage 1224 may also include other external storage, such as an external hard drive, or insertable storage, such as an SD card. Storage 1224 may be persistent and/or volatile. In some embodiments, storage 1224 may include a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 1215 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201) and may take any of the forms discussed above in connection with computer 1201. EUD 1203, which may include the components of a host 102 (FIG. 1) or a controller 116 (FIG. 1 or controller 216 (FIG. 2), typically sends and receives helpful and useful data which would typically be communicated through network module 1215 of computer 1201 through WAN 1202 to EUD 1203. In this way, EUD 1203 can display, or otherwise present, useful data to be stored or read. In some embodiments, EUD 1203 may be a client device, such as thin client, heavy client, mainframe computer, desktop computer and so on.

REMOTE SERVER 1204 is any computer system that serves at least some data and/or functionality to computer 1201. Remote server 1204 may be controlled and used by the same entity that operates computer 1201. Remote server 1204 may provide for the execution of at least some of the computer code involved in performing the inventive methods, including segmented tape head skew-based compensation in accordance with the present description.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The controller 128 and the computer 140 of FIG. 1 are described as performing various logic functions. In one embodiment, the controller 128 and the computer 140 includes processors which cause operations which perform the various logic functions. Alternatively, one or more of these logic functions may be performed by one or more of programmed centralized processors such as central processing units (CPUs) and programmed distributed processors such as integrated circuit logic devices such as Application Specific Integrated Circuit (ASIC) devices, for example. Programming of such hardware may be provided by one or more of software and firmware alone or in combination and stored in a memory of the controller 128. In other embodiments, some or all of the logic functions of the controller 128 and computer 140 may be performed by dedicated or hard-wired logic circuitry.

One or more of the controllers 128 and computer 140 may be implemented as program modes which may comprise routines, programs, objects, components, logic, data structures, and so on that perform particular tasks or implement particular abstract data types. The program components and hardware devices of the tape drive 100 of FIG. 1 may be implemented in one or more computer systems, where if they are implemented in multiple computer systems, then the computer systems may communicate over a network.

The present invention may be a system, device, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing g. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape head for writing and reading tracks of data on magnetic tape, comprising:
   a module having a beam substrate and an array of transducers carried on the beam substrate wherein the beam substrate has a first beam substrate segment member and a second beam substrate segment member pivotally coupled to the first beam substrate segment member at a pivot angle for relative pivotal motion between the first and second beam substrate segment members, each beam substrate segment member carrying a linear subarray of the array of transducers.

2. The tape head of claim 1 wherein the module further has a controllable actuator coupled to the first and second beam substrate segment members and configured to control the relative pivotal motion between the first and second beam substrate segment members.

3. The tape head of claim 2 wherein the beam substrate has a flexural hinge member pivotally coupling the first and second beam substrate segment members, wherein the flexural hinge member is configured to function as a living hinge guiding the relative pivotal motion between the first and second beam substrate segment members.

4. The tape head of claim 2 wherein the controllable actuator includes a piezo configured to selectively expand and contract to control the relative pivotal motion between the first and second beam substrate segment members.

5. The tape head of claim 2 wherein the beam substrate has a flexural hinge member comprising a flexible substrate material coupling the first and second beam substrate segment members and configured for flexing to bend the beam substrate between the first and second beam substrate segment members to guide the relative pivotal motion between the first and second beam substrate segment members.

6. The tape head of claim 5 wherein a beam substrate segment member has a width and wherein the beam substrate has a concave shaped wall defining a beam substrate notch adjacent to the flexural hinge member of the beam substrate so that the flexural hinge member has a reduced width as compared to a beam substrate segment member width.

7. The tape head of claim 6 wherein the controllable actuator includes a piezo disposed within the beam substrate notch and configured to engage the notch wall of the beam substrate and selectively expand and contract the beam substrate notch to control the relative pivotal motion between the first and second beam substrate segment members.

8. The tape head of claim 6 wherein the controllable actuator includes a thermal actuator disposed within the beam substrate notch and configured to engage the notch wall of the beam substrate and selectively expand and contract the beam substrate notch to control the relative pivotal motion between the first and second beam substrate segment members.

9. The tape head of claim 1 wherein the beam substrate has a plurality of pairs of adjacent beam substrate members, each pair of adjacent beam substrate members having a beam substrate segment member pivotally coupled to an adjacent beam substrate segment member of the pair, each beam substrate segment member carrying a linear subarray of the array of transducers, and wherein the module further has for each pair of adjacent beam substrate members, a controllable actuator coupled to adjacent beam substrate segment members of a pair of adjacent beam substrate members and configured to control relative pivotal motion between adjacent beam substrate segment members of a pair of adjacent beam substrate members.

10. A data storage system for a magnetic tape, comprising:
a segmented tape head module having a beam substrate and an array of transducers carried on the beam substrate wherein the beam substrate has a first beam substrate segment member and a second beam substrate segment member pivotally coupled to the first beam substrate segment member at a pivot angle, each beam substrate segment member carrying a linear subarray of the array of transducers;
a processor; and
a computer readable storage medium, implemented in the data storage system, and
having computer readable program code embodied therein that when executed performs operations, the operations comprising:
transferring data between the tape head module and the tape, wherein the transferring data includes at least one of reading from and writing to data tracks of the tape; and
controlling relative pivotal motion between the first and second beam substrate segment members to align transducers carried by the beam substrate segment members with the data of the tape as data is transferred between the tape head module and data tracks of the tape.

11. The data storage system of claim 10 wherein the module further has a controllable actuator coupled to the first and second beam substrate segment members, and wherein controlling the relative pivotal motion between the first and second beam substrate segment members includes actuating the actuator to control the relative pivotal motion between the first and second beam substrate segment members.

12. The data storage system of claim 11 wherein the beam substrate has a flexural hinge member pivotally coupling the first and second beam substrate segment members, and wherein actuating the actuator to control the relative pivotal motion between the first and second beam substrate segment members includes actuating the actuator to flex the flexural hinge member as a living hinge to guide the relative pivotal motion between the first and second beam substrate segment members.

13. The data storage system of claim 11 wherein the controllable actuator includes a piezo and wherein actuating the actuator to control the relative pivotal motion between the first and second beam substrate segment members includes selectively expanding and contracting the piezo to control the relative pivotal motion between the first and second beam substrate segment members.

14. The data storage system of claim 11 wherein the beam substrate has a flexural hinge member comprising a flexible substrate material coupling the first and second beam substrate segment members and wherein actuating the actuator to control the relative pivotal motion between the first and second beam substrate segment members includes actuating the actuator to flex the flexible substrate material of the flexural hinge member as a living hinge to bend the beam substrate between the first and second beam substrate segment members to guide the relative pivotal motion between the first and second beam substrate segment members.

15. The data storage system of claim 14 wherein a beam substrate segment member has a width and wherein the beam substrate has a concave shaped wall defining a beam substrate notch adjacent to the flexural hinge member of the beam substrate so that the flexural hinge member has a reduced width as compared to a beam substrate segment member width.

16. The data storage system of claim 15 wherein the controllable actuator includes a piezo disposed within the beam substrate notch and coupled to the notch wall of the beam substrate and wherein actuating the actuator to flex the flexible substrate material of the flexural hinge member includes selectively expanding and contracting the piezo to selectively expand and contract the beam substrate notch to control the relative pivotal motion between the first and second beam substrate segment members.

17. The data storage system of claim 10 wherein the beam substrate has a plurality of pairs of adjacent beam substrate members, each pair of adjacent beam substrate members having a beam substrate segment member pivotally coupled to an adjacent beam substrate segment member of the pair, each beam substrate segment member carrying a linear subarray of the array of transducers, and wherein the module further has for each pair of adjacent beam substrate members, a controllable actuator coupled to adjacent beam substrate segment members of a pair of adjacent beam substrate members, and wherein the operations further include controlling the relative pivotal motion between adjacent beam substrate segment members of each pair of adjacent beam substrate segment members to align transducers of the beam substrate segment members with the data tracks of the tape as data is transferred between the tape head module and data tracks of the tape, and wherein controlling the relative pivotal motion between adjacent beam substrate segment members includes actuating each actuator to control the relative pivotal motion between adjacent beam substrate segment members of each pair of adjacent beam substrate segment members.

18. A computer-implemented method, tape; comprising:
transferring data between a segmented tape head module of a tape head and magnetic tape of a data storage system, wherein the transferring data includes at least one of reading from and writing to data tracks of the tape; and
controlling relative pivotal motion at a pivot angle between pivotally coupled first and second beam substrate segment members of a beam substrate of the segmented tape head module, to align transducers carried by the beam substrate segment members with the data tracks of the tape as data is transferred between the tape head module and data tracks of the tape.

19. The method of claim 18 wherein controlling the relative pivotal motion between the first and second beam substrate segment members includes actuating a controllable actuator coupled to the first and second beam substrate segment members of the module, to control the relative pivotal motion between the first and second beam substrate segment members.

20. The method of claim 19 wherein actuating the actuator includes flexing a flexural hinge member pivotally coupling the first and second beam substrate segment members, as a living hinge to guide the relative pivotal motion between the first and second beam substrate segment members.

21. The method of claim 19 wherein actuating the actuator includes selectively expanding and contracting a piezo to control the relative pivotal motion between the first and second beam substrate segment members.

22. The method of claim 19 wherein actuating the actuator includes flexing a flexible substrate material of a flexural hinge member to bend the beam substrate between the first and second beam substrate segment members and to guide the relative pivotal motion between the first and second beam substrate segment members.

23. The method of claim 22 wherein actuating the actuator includes selectively expanding and contracting a beam substrate notch defined by a concave shaped wall adjacent to the flexural hinge member of the beam substrate.

24. The method of claim 23 wherein selectively expanding and contracting the beam substrate notch adjacent to the flexural hinge member includes selectively expanding and contracting a piezo disposed within the beam substrate notch and coupled to the notch wall of the beam substrate to control the relative pivotal motion between the first and second beam substrate segment members.

25. The method of claim 18 further comprising controlling the relative pivotal motions between adjacent pivotally coupled beam substrate segment members of a plurality of pairs of adjacent pivotally coupled beam substrate members, to align transducers of tape module segment members with the data tracks of the tape as data is transferred between the tape head module and data tracks of the tape, and
wherein controlling the relative pivotal motion between adjacent pivotally coupled beam substrate segment members of the plurality of pairs of adjacent pivotally coupled beam substrate members includes actuating a plurality of actuators, each actuator being coupled to adjacent beam substrate segment members of a pair of adjacent beam substrate members, to control the relative pivotal motion between adjacent beam substrate segment members of each pair of adjacent beam substrate segment members.

* * * * *